(12) United States Patent
Aziz et al.

(10) Patent No.: US 7,503,045 B1
(45) Date of Patent: *Mar. 10, 2009

(54) EXTENSIBLE COMPUTING SYSTEM

(75) Inventors: Ashar Aziz, Fremont, CA (US); Tom Markson, San Mateo, CA (US); Martin Patterson, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 851 days.

This patent is subject to a terminal disclaimer.

(21) Appl. No.: 10/917,163

(22) Filed: Aug. 11, 2004

Related U.S. Application Data

(63) Continuation of application No. 09/502,170, filed on Feb. 11, 2000, now Pat. No. 6,779,016.

(60) Provisional application No. 60/150,394, filed on Aug. 23, 1999.

(51) Int. Cl.
G06F 9/46 (2006.01)
G06F 15/173 (2006.01)
G06F 15/16 (2006.01)

(52) U.S. Cl. ............... 718/104; 718/105; 709/225; 709/226; 709/229

(58) Field of Classification Search ........... 718/104, 718/1, 100, 101, 102, 103, 105; 709/226; 719/220, 221, 223, 225, 226, 229
See application file for complete search history.

(56) References Cited

U.S. PATENT DOCUMENTS

| 4,591,967 | A | | 5/1986 | Mattes et al. |
|---|---|---|---|---|
| 4,843,541 | A | * | 6/1989 | Bean et al. ............... 710/36 |
| 5,163,130 | A | | 11/1992 | Hullot |
| 5,504,670 | A | | 4/1996 | Barth et al. |
| 5,506,975 | A | * | 4/1996 | Onodera .................. 718/1 |

(Continued)

FOREIGN PATENT DOCUMENTS

EP 0 490 624 A2 6/1992

(Continued)

OTHER PUBLICATIONS

Microsoft Press Computer Dictionary, Third Edition, Microsoft Press Publishing 1997, p. 197.

(Continued)

*Primary Examiner*—Meng-Ai An
*Assistant Examiner*—Abdullah Al Kawsar
(74) *Attorney, Agent, or Firm*—Hickerman Palermo Truong & Becker LLP

(57) ABSTRACT

Methods and apparatus providing a dynamically sized, highly scalable and available server farm are disclosed. A Virtual Server Farm (VSF) is created out of a wide scale computing fabric ("Computing Grid") which is physically constructed once and then logically divided up into VSFs for various organizations on demand. Each organization retains independent administrative control of a VSF. A VSF is dynamically firewalled within the Computing Grid. Allocation and control of the elements and topology in the VSF is performed by a Control Plane connected to all computing, networking, and storage elements in the computing grid through special control ports. No physical rewiring is necessary in order to construct VSFs in many different configurations, including single-tier Web server or multi-tier Web-server, application server, database server configurations.

26 Claims, 17 Drawing Sheets

U.S. PATENT DOCUMENTS

| | | | |
|---|---|---|---|
| 5,544,313 A * | 8/1996 | Shachnai et al. | 725/92 |
| 5,574,914 A | 11/1996 | Hancock et al. | |
| 5,590,284 A | 12/1996 | Crosetto | |
| 5,659,756 A * | 8/1997 | Hefferon et al. | 710/200 |
| 5,659,786 A | 8/1997 | George et al. | |
| 5,751,967 A | 5/1998 | Raab et al. | |
| 5,819,042 A | 10/1998 | Hansen | |
| 5,821,937 A | 10/1998 | Tonelli et al. | |
| 5,878,232 A | 3/1999 | Marimuthu | |
| 5,951,683 A | 9/1999 | Yuuki et al. | |
| 5,974,563 A | 10/1999 | Beeler, Jr. | |
| 6,067,545 A * | 5/2000 | Wolff | 707/10 |
| 6,173,322 B1 | 1/2001 | Hu | |
| 6,182,139 B1 | 1/2001 | Brendel | |
| 6,212,559 B1 | 4/2001 | Bixler et al. | |
| 6,219,699 B1 | 4/2001 | McCloghrie et al. | |
| 6,223,218 B1 | 4/2001 | Iijima et al. | |
| 6,230,200 B1 | 5/2001 | Forecast et al. | |
| 6,363,421 B2 | 3/2002 | Barker et al. | |
| 6,381,321 B1 | 4/2002 | Brown et al. | |
| 6,389,432 B1 | 5/2002 | Pothapragada et al. | |
| 6,446,141 B1 | 9/2002 | Nolan et al. | |
| 6,463,454 B1 * | 10/2002 | Lumelsky et al. | 718/105 |
| 6,466,559 B1 | 10/2002 | Johansson et al. | |
| 6,466,980 B1 | 10/2002 | Lumelsky | |
| 6,467,007 B1 * | 10/2002 | Armstrong et al. | 710/260 |
| 6,470,386 B1 | 10/2002 | Combar et al. | |
| 6,505,229 B1 | 1/2003 | Turner et al. | |
| 6,597,956 B1 | 7/2003 | Aziz et al. | |
| 7,020,628 B2 | 3/2006 | Peterson et al. | |
| 2002/0052941 A1 | 5/2002 | Patterson et al. | |

FOREIGN PATENT DOCUMENTS

| | | |
|---|---|---|
| EP | 0 750 256 A2 | 12/1996 |
| EP | 0 791 881 A1 | 8/1997 |
| EP | 0 262 750 A2 | 4/1998 |
| EP | 0 905 621 A1 | 3/1999 |
| EP | 0 917 056 A2 | 5/1999 |
| EP | 0917056 A3 | 5/1999 |
| EP | 0 935 200 A1 | 8/1999 |
| WO | WO 97/49214 A1 | 12/1997 |
| WO | WO 99/57957 A2 | 11/1999 |
| WO | WO 00/29954 A1 | 5/2000 |

OTHER PUBLICATIONS

European Patent Office, "Communication pursuant to Article 94(3) EPC", Foreign application No. 01950298.8-2211, dated Feb. 29 2008, 5 pages.

Claims, Foreign application No. 01950298.8-2211, 9 pages.

Fox, Armando, et al., "Cluster-Based Scalable Network Services," Operating Systems Review (SIGOPS), US, ACM Headquarters, New York, vol. 31, Dec. 1, 1997, XP-000771023, pp. 78-91.

Muller, Nathan J., "Design and Conquer," Oct. 1996, BYTE, vol. 21, No. 10, XP-000683573, pp. 93-98.

Prud'Hommeaux, Eric, "XML-based HTTP Server Configuration Language," http://www.w3.org/1999/07/9 http-servir-conf.html, Sep. 7, 1999, XP-002152599, pp. 1-5.

Short, ROB, et al., "Windows NT Clusters for Availability and Scalability," 1997 IEEE, pp. 8-13.

Vingralek, Radek, et al., "Snowball: Scalable Storage on Networks of Workstations with Balanced Load," Distributed and Parallel Databases, vol. 6, No. 2, Apr. 1998, XP-002162201, pp. 117-156.

Harold, Elliotte Rusty, 1 "XML: Extensible Markup Language," 1998, IDG Books Worldwide, Inc., Foster City, CA, pp. 1-85.

Harold, Elliotte Rusty, 2 "XML: Extensible Markup Language," 1998, IDG Books Worldwide, Inc., Foster City, CA, pp. 86-189.

Harold, Elliotte Rusty, 3 "XML: Extensible Markup Language," 1998, IDG Books Worldwide, Inc., Foster City, CA, pp. 190-296.

Harold, Elliotte Rusty, 4 "XML: Extensible Markup Language," 1998, IDG Books Worldwide, Inc., Foster City, CA, pp. 297-400.

Harold, Elliotte Rusty, 5 "XML: Extensible Markup Language," 1998, IDG Books Worldwide, Inc., Foster City, CA, pp. 401-430.

* cited by examiner

SINGLE MACHINE

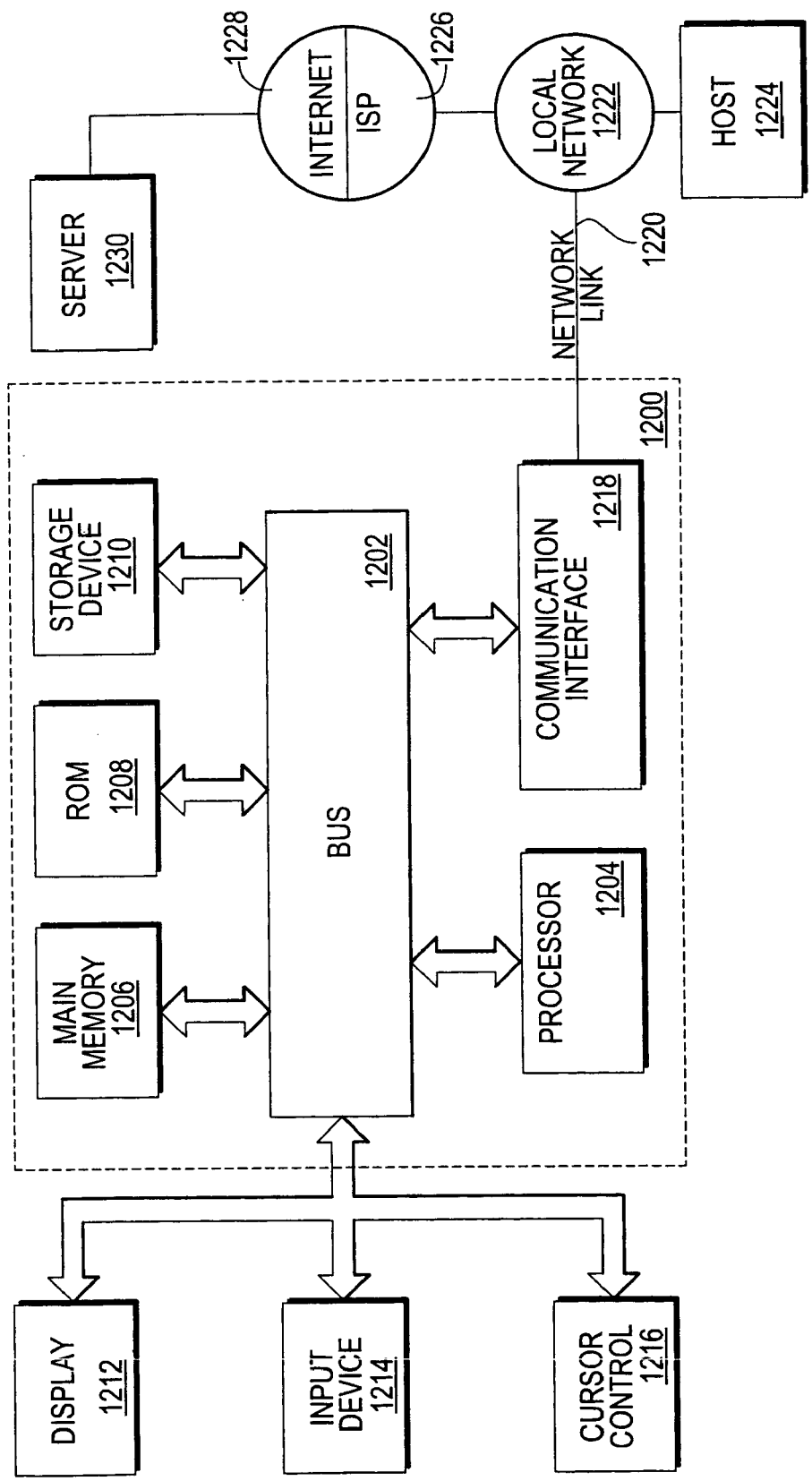

EXTENSIBLE COMPUTING SYSTEM

RELATED APPLICATIONS AND CLAIM OF PRIORITY

This application is a continuation of and claims priority to U.S. patent application Ser. No. 09/502,170, filed on Feb. 11, 2000, now U.S. Pat. No. 6,779,016 entitled "EXTENSIBLE COMPUTING SYSTEM", which claims priority to Provisional Application Ser. No. 60/150,394, filed on Aug. 23, 1999, entitled "EXTENSIBLE COMPUTING SYSTEM", the contents both of which are hereby incorporated by reference in their entirety for all purposes.

This application is related to U.S. patent application Ser. No. 09/630,440, now issued as U.S. Pat. No. 6,597,956, filed on Aug. 2, 2000, entitled "METHOD AND APPARATUS FOR CONTROLLING AN EXTENSIBLE COMPUTING SYSTEM", which is a continuation-in-part application of U.S. patent application Ser. No. 09/502,170, filed Feb. 11, 2000, entitled "EXTENSIBLE COMPUTING SYSTEM".

This application is related to U.S. patent application Ser. No. 09/863,945, filed on May 22, 2001, entitled "GRAPHICAL EDITOR FOR DEFINING AND CREATING A COMPUTER SYSTEM", which is a continuation-in-part application of U.S. patent application Ser. No. 09/502,170, filed Feb. 11, 2000, entitled "EXTENSIBLE COMPUTING SYSTEM".

This application is related to U.S. patent application Ser. No. 09/818,424, filed on Mar. 26, 2001, entitled "SYMBOLIC DEFINITION OF A COMPUTER SYSTEM", which is a continuation-in-part application of U.S. patent application Ser. No. 09/502,170, filed Feb. 11, 2000, entitled "EXTENSIBLE COMPUTING SYSTEM".

This application is related to U.S. patent application Ser. No. 10/104,886, now issued as U.S. Pat. No. 6,714,980, filed on Mar. 22, 2002, entitled "BACKUP AND RESTORE OF A DATA ASSOCIATED WITH A HOST IN A DYNAMICALLY CHANGING VIRTUAL SERVER FARM WITHOUT INVOLVEMENT OF A SERVER THAT USES AN ASSOCIATED STORAGE DEVICE", which is a continuation-in-part application of U.S. patent application Ser. No. 09/502,170, filed Feb. 11, 2000, entitled "EXTENSIBLE COMPUTING SYSTEM".

FIELD OF THE INVENTION

The present invention generally relates to data processing. The invention relates more specifically to methods, apparatus, and mechanisms providing an extensible, flexible, and scalable computing system.

BACKGROUND OF THE INVENTION

Builders of Web sites and other computer systems today have to deal with many systems planning issues. These include capacity planning for normal growth, expected or unexpected peak demand, availability and security of the site, etc. Companies who wish to provide services on the Web have new business and service models, which are the areas in which they want to innovate and lead, but in order to do so they have to deal with the non-trivial complexity of designing, building and operating a large-scale Web site. This includes the need to grow and scale the site while it is operational.

Doing all this requires finding and hiring trained personnel capable of engineering and operating such a site, which may be potentially large and complicated. This is creating difficulty for many organizations, because designing, constructing and operating such large sites is simply not their core competency.

One response to these issues is to host an enterprise Web site at a third party site, co-located with other Web sites of other enterprises. Such outsourcing facilities are currently available from companies such as Exodus, AboveNet, GlobalCenter, etc. These facilities provide physical space, and redundant network and power facilities so that the enterprise customer or user need not provide them. The network and power facilities are shared among many enterprises or customers.

However, the users of these facilities are still required to do a lot of work relating to their computing infrastructure in the course of building, operating and growing their facilities. Information technology managers of the enterprises hosted at such facilities remain responsible for selecting, installing, configuring, and maintaining their own computing equipment at the facilities. The managers must still confront difficult issues such as resource planning and handling peak capacity.

Even when outsourcing companies also provide computing facilities (e.g., Digex), the facilities are no easier to scale and grow for the outsourcing company, because growth involves the same manual and error-prone administrative steps. In addition, problems remain with capacity planning for unexpected peak demand.

Further, each Web site may have different requirements. For example, particular Web sites may require the ability to be independently administered and controlled. Others may require a particular type or level of security that isolates the Web site from all other sites that are co-located at the service provider. Others may require a secure connection to an enterprise Intranet located elsewhere.

Also, various Web sites differ in internal topology. Some sites simply comprise a row of Web servers that are load balanced by a Web load balancer. Suitable load balancers are Local Director from Cisco Systems, Inc., BigIP from F5Labs, Web Director from Alteon, etc. Other sites may be constructed in a multi-tier fashion, whereby a row of Web servers handle Hypertext Transfer Protocol (HTTP) requests, but the bulk of the application logic is implemented in separate application servers. These application servers in turn may need to be connected back to a tier of database servers.

Some of these different configuration scenarios are shown in FIG. 1A, FIG. 1B, and FIG. 1C. FIG. 1A is a block diagram of a simple Web site, comprising a single machine 100 comprising a CPU 102 and disk 104. Machine 100 is coupled to the global, packet-switched data network known as the Internet 106, or to another network. Machine 100 may be housed in a co-location service of the type described above.

FIG. 1B is a block diagram of a 1-tier Web server farm 110 comprising a plurality of Web servers WSA, WSB, WSC. Each of the Web servers is coupled to a load-balancer 112 that is coupled to Internet 106. The load balancer divides the traffic between the servers to maintain a balanced processing load on each server. Load balancer 112 may also include or may be coupled to a firewall for protecting the Web servers from unauthorized traffic.

FIG. 1C shows a 3-tier server farm 120 comprising a tier of Web servers W1, W2, etc., a tier of application servers A1, A2, etc., and a tier of database servers D1, D2, etc. The Web servers are provided for handling HTTP requests. The application servers execute the bulk of the application logic. The database servers execute database management system (DBMS) software.

Given the diversity in topology of the kinds of Web sites that may need to be constructed, it may appear that the only way for constructing large-scale Web sites is to custom build each one. Indeed, this is the conventional approach. Many organizations are separately struggling with the same issues, and custom building each Web site from scratch. This is inefficient and involves a significant amount of duplicate work at different enterprises.

Still another problem with the conventional approach is resource and capacity planning. A Web site may receive vastly different levels of traffic on different days or at different hours within each day. At peak traffic times, the Web site hardware or software may be unable to respond to requests in a reasonable time because it is overloaded. At other times, the Web site hardware or software may have excess capacity and be underutilized. In the conventional approach, finding a balance between having sufficient hardware and software to handle peak traffic, without incurring excessive costs or having over-capacity, is a difficult problem. Many Web sites never find the right balance and chronically suffer from under-capacity or excess capacity.

Yet another problem is failure induced by human error. A great potential hazard present in the current approach of using manually constructed server farms is that human error in configuring a new server into a live server farm can cause the server farm to malfunction, possibly resulting in loss of service to users of that Web site.

Based on the foregoing, there is a clear need in this field for improved methods and apparatus for providing a computing system that is instantly and easily extensible on demand without requiring custom construction.

There is also a need for a computing system that supports creation of multiple segregated processing nodes, each of which can be expanded or collapsed as needed to account for changes in traffic throughput. Other needs will become apparent in the disclosure provided in this document.

SUMMARY OF THE INVENTION

The foregoing needs and objects, and other needs and objects that will become apparent from the following description, are achieved by the present invention, which comprises, in one aspect, a method and apparatus for creating highly scalable, highly available and secure data processing sites, based on a wide scale computing fabric ("computing grid"). The computing grid is physically constructed once, and then logically divided up for various organizations on demand. The computing grid comprises a large plurality of computing elements that are coupled to one or more VLAN switches and to one or more storage area network (SAN) switches. A plurality of storage devices are coupled to the SAN switches and may be selectively coupled to one or more of the computing elements through appropriate switching logic and commands. One port of the VLAN switch is coupled to an external network, such as the Internet. A supervisory mechanism, layer, machine or process is coupled to the VLAN switches and SAN switches.

Initially, all storage devices and computing elements are assigned to Idle Pools. Under program control, the supervisory mechanism dynamically configures the VLAN switches and SAN switches to couple their ports to one or more computing elements and storage devices. As a result, such elements and devices are logically removed from the Idle Pools and become part of one or more virtual server farms (VSFs). Each VSF computing element is pointed to or otherwise associated with a storage device that contains a boot image usable by the computing element for bootstrap operation and production execution.

By physically constructing the computing grid once, and securely and dynamically allocating portions of the computing grid to various organizations on demand, economies of scale are achieved that are difficult to achieve when doing a custom build of each site.

BRIEF DESCRIPTION OF THE DRAWINGS

The present invention is illustrated by way of example, and not by way of limitation, in the figures of the accompanying drawings and in which like reference numerals refer to similar elements and in which:

FIG. 12 is a block diagram of a computer system with which an embodiment may be implemented.

DETAILED DESCRIPTION OF THE PREFERRED EMBODIMENT

Figure 1A:
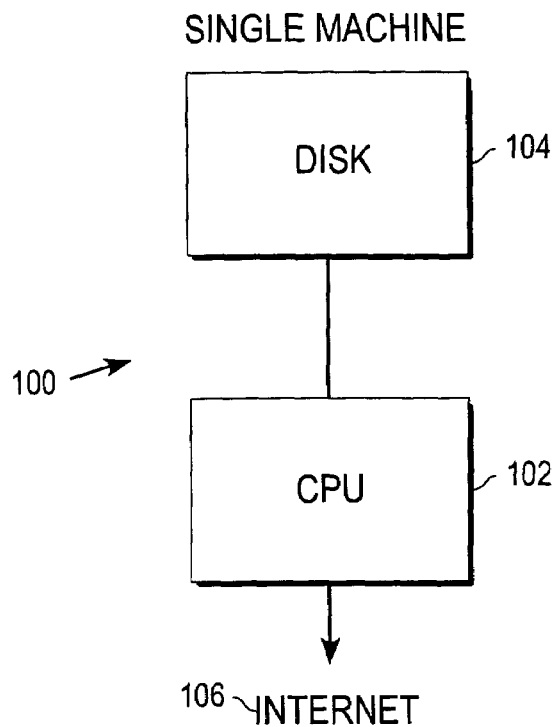
FIG. 1A is a block diagram of a simple Web site having a single machine topology.
Figure 1B:
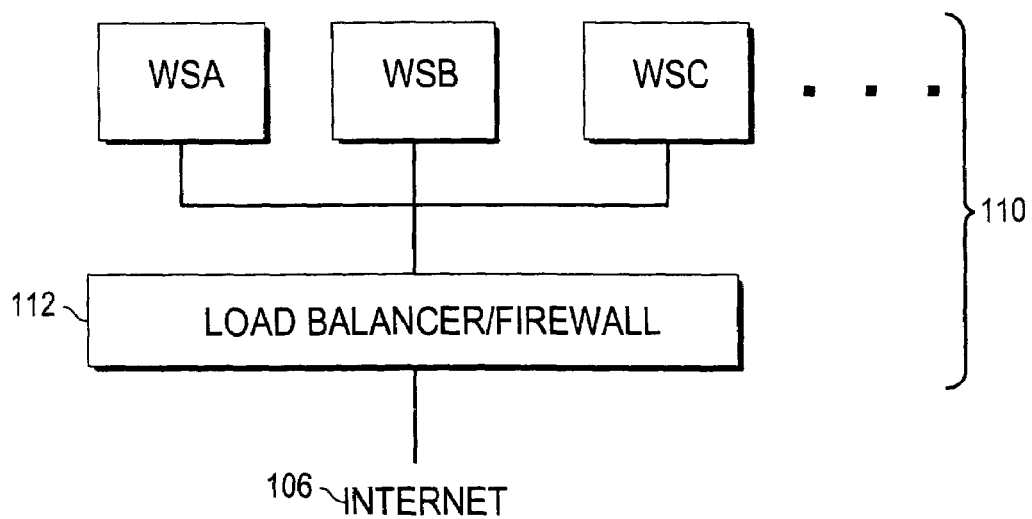
FIG. 1B is a block diagram of a one-tier Web server farm.
Figure 1C:
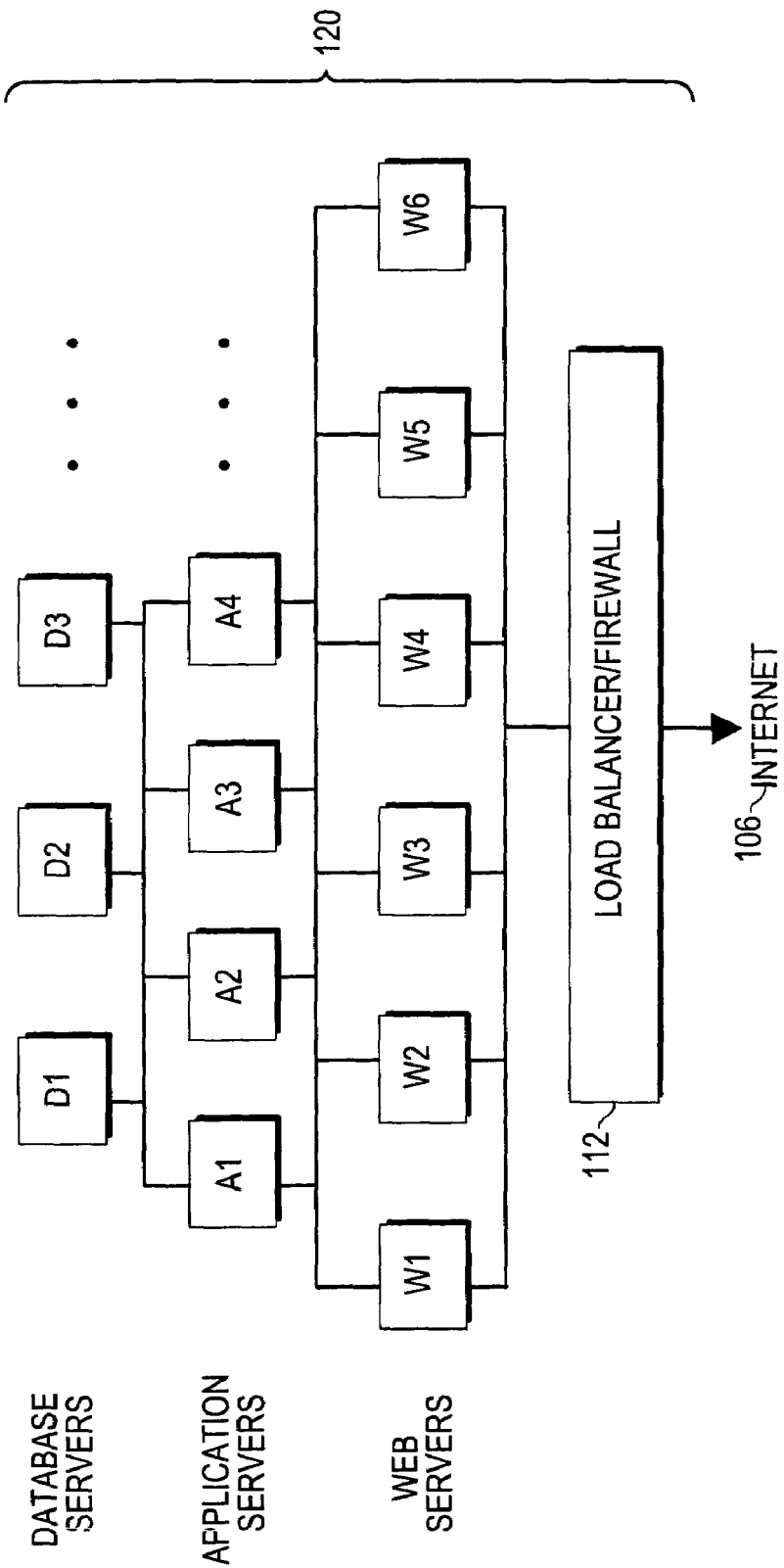
FIG. 1C is a block diagram of a three-tier Web server farm.

A method and apparatus for providing an extensible computing system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Virtual Server Farm (VSF)

According to one embodiment, a wide scale computing fabric ("computing grid") is provided. The computing grid can be physically constructed once, and then logically divided up for various organizations on demand. A part of the computing grid is allocated to each of a plurality of enterprises or organizations. Each organization's logical portion of the computing grid is referred to as a Virtual Server Farm (VSF). Each organization retains independent administrative control of its VSF. Each VSF can change dynamically in terms of number of CPUs, storage capacity and disk and network bandwidth based on real-time demands placed on the server farm or other factors. Each VSF is secure from every other organizations' VSF, even though they are all logically created out of the same physical computing grid. A VSF can be connected back to an Intranet using either a private leased line or a Virtual Private Network (VPN), without exposing the Intranet to other organizations' VSFs.

An organization can access only the data and computing elements in the portion of the computing grid allocated to it, that is, in its VSF, even though it may exercise full (e.g. super-user or root) administrative access to these computers and can observe all traffic on Local Area Networks (LANs) to which these computers are connected. This is accomplished using a dynamic firewalling scheme, where the security perimeter of the VSF expands and shrinks dynamically.

Each VSF can be used to host the content and applications of an organization which may be accessed via the Internet, Intranet or Extranet.

Configuration and control of the computing elements and their associated networking and storage elements is performed by a supervisory mechanism which is not directly accessible through any of the computing elements in the computing grid. For convenience, in this document the supervisory mechanism is called Control Plane and may comprise one or more processors or a network of processors. The supervisory mechanism may comprise a Supervisor, Controller, etc. Other approaches may be used, as described herein.

The Control Plane runs on a completely independent set of computing elements assigned for supervisory purposes, such as one or more servers that may be interconnected in a network or by other means. It performs control actions on the computing, networking and storage elements of the computing grid through special control ports or interfaces of the networking and storage elements in the grid. The Control Plane provides a physical interface to switching elements of the system, monitors loads of computing elements in the system, and provides administrative and management functions using a graphical user interface or other suitable user interface.

Computers running the Control Plane are logically invisible to the computers in the computing grid (and therefore in any specific VSF) and cannot be attacked or subverted in any way via elements in the computing grid or from external computers. Only the Control Plane has physical connections to the control ports on devices in the computing grid, which controls membership in a particular VSF. The devices in the computing can be configured only through these special control ports, and therefore computing elements in the computing grid are unable to change their security perimeter or access storage or computing devices which they are not authorized to do.

Thus, a VSF allows organizations to work with computing facilities that appear to comprise a private server farm, dynamically created out of a large-scale shared computing infrastructure, namely the computing grid. A Control Plane coupled with the computing architecture described herein provides a private server farm whose privacy and integrity is protected through access control mechanisms implemented in the hardware of the devices of the computing grid.

The internal topology of each VSF is controlled by the Control Plane. The Control Plane can take the basic interconnection of computers, network switches and storage network switches described herein and use them to create a variety of server farm configurations. These include but are not limited to, single-tier Web server farms front-ended by a load balancer, as well as multi-tier configurations, where a Web server talks to an application server, which in turn talks to a database server. A variety of load balancing, multi-tiering and firewalling configurations are possible.

The Computing Grid

The computing grid may exist in a single location or may be distributed over a wide area First this document describes the computing grid in the context of a single building-sized network, composed purely of local area technologies. Then the document describes the case where the computing grid is distributed over a wide area network (WAN).

Figure 2:
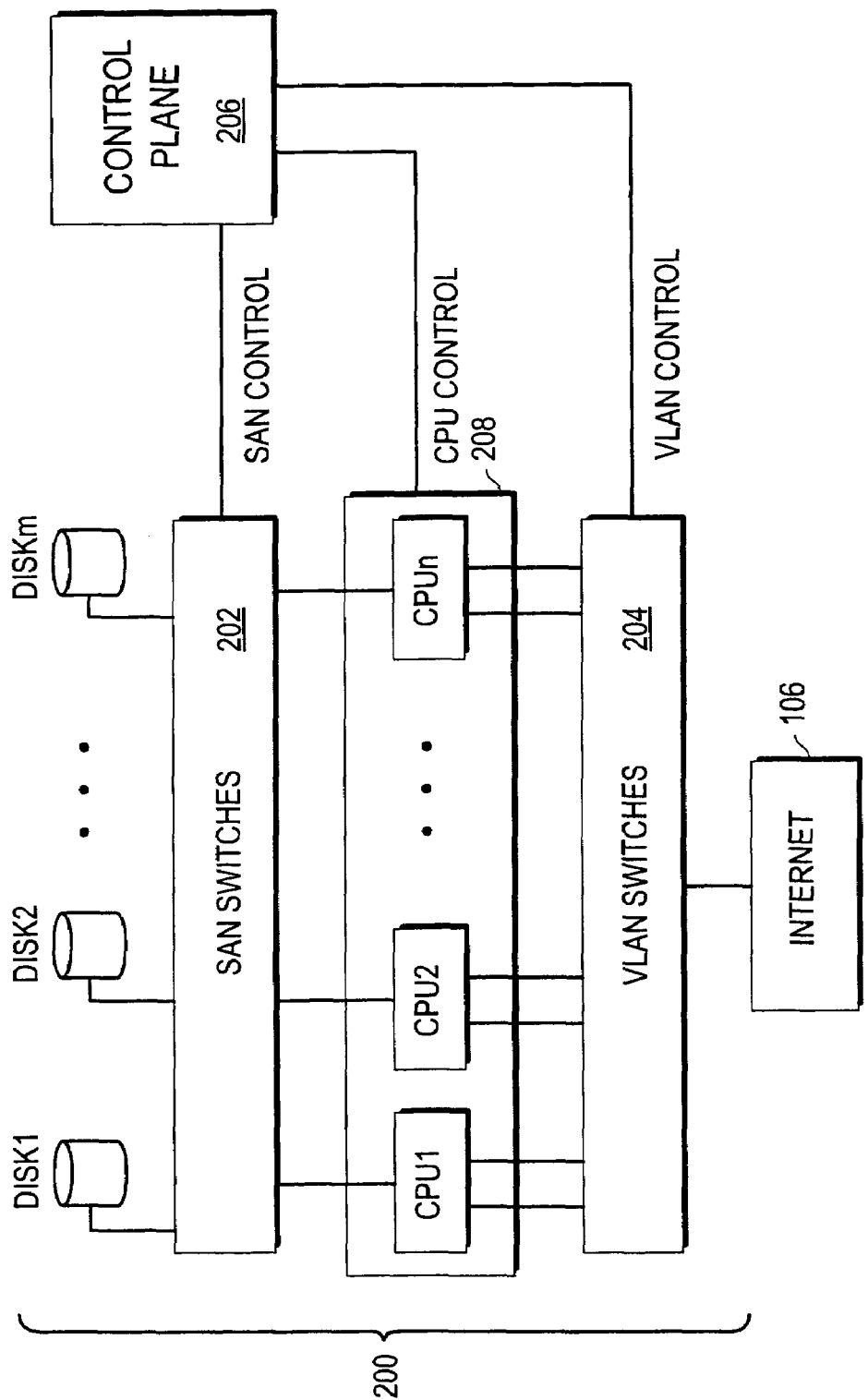
FIG. 2 is a block diagram of one configuration of an extensible computing system 200 that includes a local computing grid.

FIG. 2 is a block diagram of one configuration of an extensible computing system 200 that includes a local computing grid 208. In this document "extensible" generally means that the system is flexible and scalable, having the capability to provide increased or decreased computing power to a particular enterprise or user upon demand. The local computing grid 208 is composed of a large number of computing elements CPU1, CPU2, ... CPUn. In an exemplary embodiment, there may be 10,000 computing elements, or more. These computing elements do not contain or store any long-lived per-element state information, and therefore may be configured without persistent or non-volatile storage such as a local disk. Instead, all long lived state information is stored separate from the computing elements, on disks DISK1, DISK2, ... DISKn that are coupled to the computing elements via a Storage Area Network (SAN) comprising one or more SAN Switches 202. Suitable SAN switches are commercially available from Brocade and Excel.

All of the computing elements are interconnected to each other through one or more VLAN switches 204 which can be divided up into Virtual LANs (VLANs). The VLAN switches 204 are coupled to the Internet 106. In general a computing element contains one or two network interfaces connected to the VLAN switch. For the sake of simplicity, in FIG. 2 all nodes are shown with two network interfaces, although some may have less or more network interfaces. Many commercial vendors now provide switches supporting VLAN functionality. For example, suitable VLAN switches are commercially available from Cisco Systems, Inc. and Xtreme Networks. Similarly there are a large number of commercially available products to construct SANs, including Fibre Channel switches, SCSI-to-Fibre-Channel bridging devices, and Network Attached Storage (NAS) devices.

Control Plane 206 is coupled by a SAN Control path, CPU Control path, and VLAN Control path to SAN switches 202, CPUs CPU1, CPU2, ... CPUn, and VLAN Switches 204, respectively.

Each VSF is composed of a set of VLANs, a set of computing elements that are attached to the VLANs, and a subset of the storage available on the SAN that is coupled to the set of computing elements. The subset of the storage available on the SAN is referred to as a SAN Zone and is protected by the SAN hardware from access from computing elements which are part of other SAN zones. Preferably, VLANs that provide non-forgeable port identifiers are used to prevent one customer or end user from obtaining access to VSF resources of another customer or end user.

Figure 3:
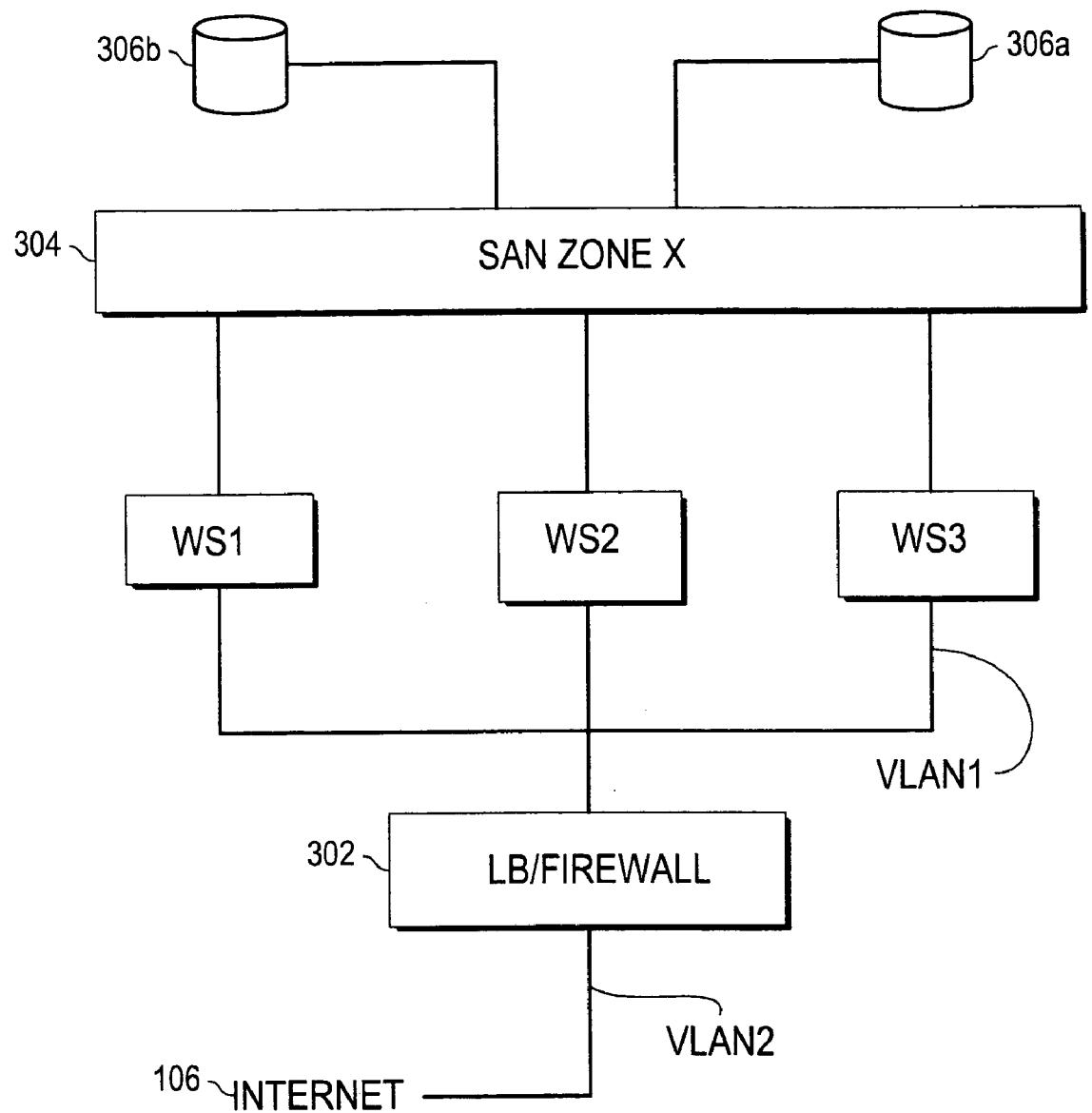
FIG. 3 is a block diagram of an exemplary virtual server farm featuring a SAN Zone.

FIG. 3 is a block diagram of an exemplary virtual server farm featuring a SAN Zone. A plurality of Web servers WS1, WS2, etc. are coupled by a first VLAN (VLAN1) to a load balancer(LB)/firewall 302. A second VLAN (VLAN2) couples the Internet 106 to the load balancer(LB)/firewall 302. Each of the Web servers may be selected from among CPU1, CPU2, etc., using mechanisms described further herein. The Web servers are coupled to a SAN Zone 304, which is coupled to one or more storage devices 306a, 306b.

At any given point in time, a computing element in the computing grid, such as CPU1 of FIG. 2, is only connected to the set of VLANs and the SAN zone(s) associated with a single VSF. A VSF typically is not shared among different organizations. The subset of storage on the SAN which belongs to a single SAN zone, and the set of VLANs associated with it and the computing elements on these VLANs define a VSF.

By controlling the membership of a VLAN and the membership of a SAN zone, Control Plane enforces a logical partitioning of the computing grid into multiple VSFs. Members of one VSF cannot access the computing or storage resources of another VSF. Such access restrictions are enforced at the hardware level by the VLAN switches, and by port-level access control mechanisms (e.g., zoning) of SAN hardware such as Fibre Channel switches and edge devices such as SCSI to Fibre Channel bridging hardware. Computing elements that form part of the computing grid are not physically connected to the control ports or interfaces of the VLAN switches and the SAN switches, and therefore cannot control the membership of the VLANs or SAN zones. Accordingly, the computing elements of the computing grid cannot access computing elements not located in the VSF in which they are contained.

Only the computing elements that run the Control Plane are physically connected to the control ports or interface of the devices in the grid. Devices in the computing grid (computers, SAN switches and VLAN switches) can only be configured through such control ports or interfaces. This provides a simple yet highly secure means of enforcing the dynamic partitioning of the computing grid into multiple VSFs.

Each computing element in a VSF is replaceable by any other computing element. The number of computing elements, VLANs and SAN zones associated with a given VSF may change over time under control of the Control Plane.

In one embodiment, the computing grid includes an Idle Pool that comprises large number of computing elements that are kept in reserve. Computing elements from the Idle Pool may be assigned to a particular VSF for reasons such as increasing the CPU or memory capacity available to that VSF, or to deal with failures of a particular computing element in a VSF. When the computing elements are configured as Web servers, the Idle Pool serves as a large "shock absorber" for varying or "bursty" Web traffic loads and related peak processing loads.

The Idle Pool is shared between many different organizations, and therefore it provides economies of scale, since no single organization has to pay for the entire cost of the Idle Pool. Different organizations can obtain computing elements from the Idle Pool at different times in the day, as needed, thereby enabling each VSF to grow when required and shrink when traffic falls down to normal. If many different organizations continue to peak at the same time and thereby potentially exhaust the capacity of the Idle Pool, the Idle Pool can be increased by adding more CPUs and storage elements to it (scalability). The capacity of the Idle Pool is engineered so as to greatly reduce the probability that, in steady state, a particular VSF may not be able to obtain an additional computing element from the Idle Pool when it needs to.

Figure 4A:
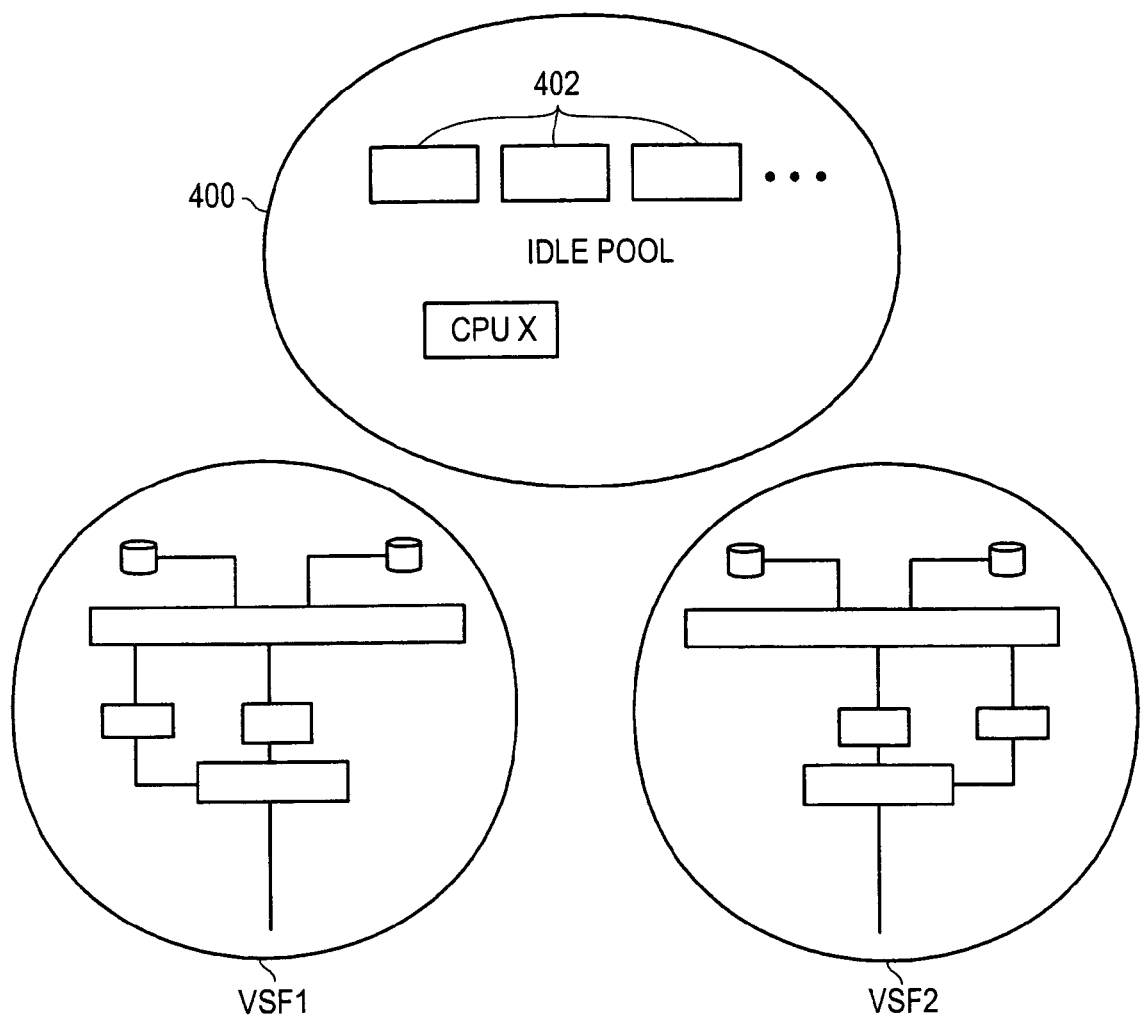
FIG. 4A, FIG. 4B, FIG. 4C, and FIG. 4D are block diagrams showing successive steps involved in adding a computing element and removing element from a virtual server farm.
Figure 4B:
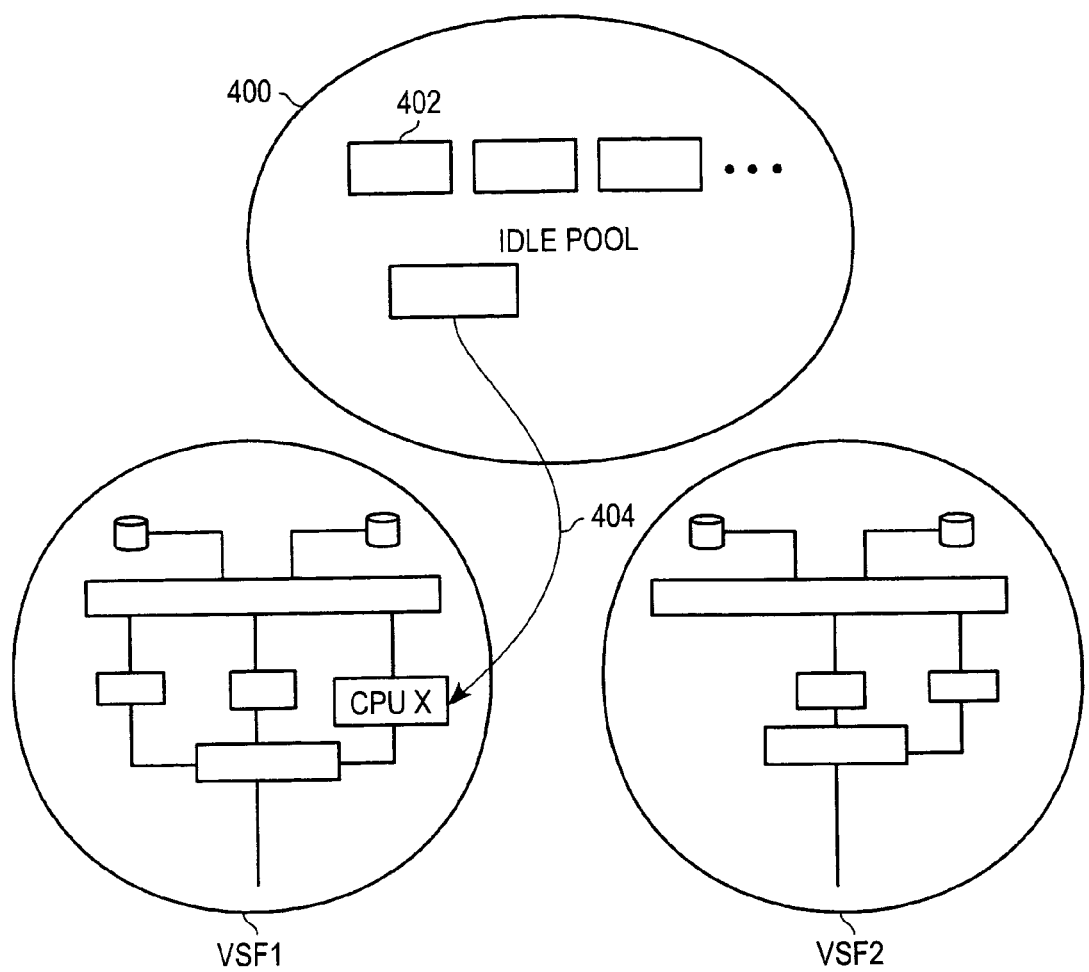

FIG. 4A, FIG. 4B, FIG. 4C, and FIG. 4D are block diagrams showing successive steps involved in moving a computing element in and out of the Idle Pool. Referring first to FIG. 4A, assume that the Control Plane has logically connected elements of the computing grid into first and second VSFs labeled VSF1, VSF2. Idle Pool 400 comprises a plurality of CPUs 402, one of which is labeled CPUX. In FIG. 4B, VSF1 has developed a need for an additional computing element. Accordingly, the Control Plane moves CPUX from Idle Pool 400 to VSF1, as indicated by path 404.

Figure 4C:
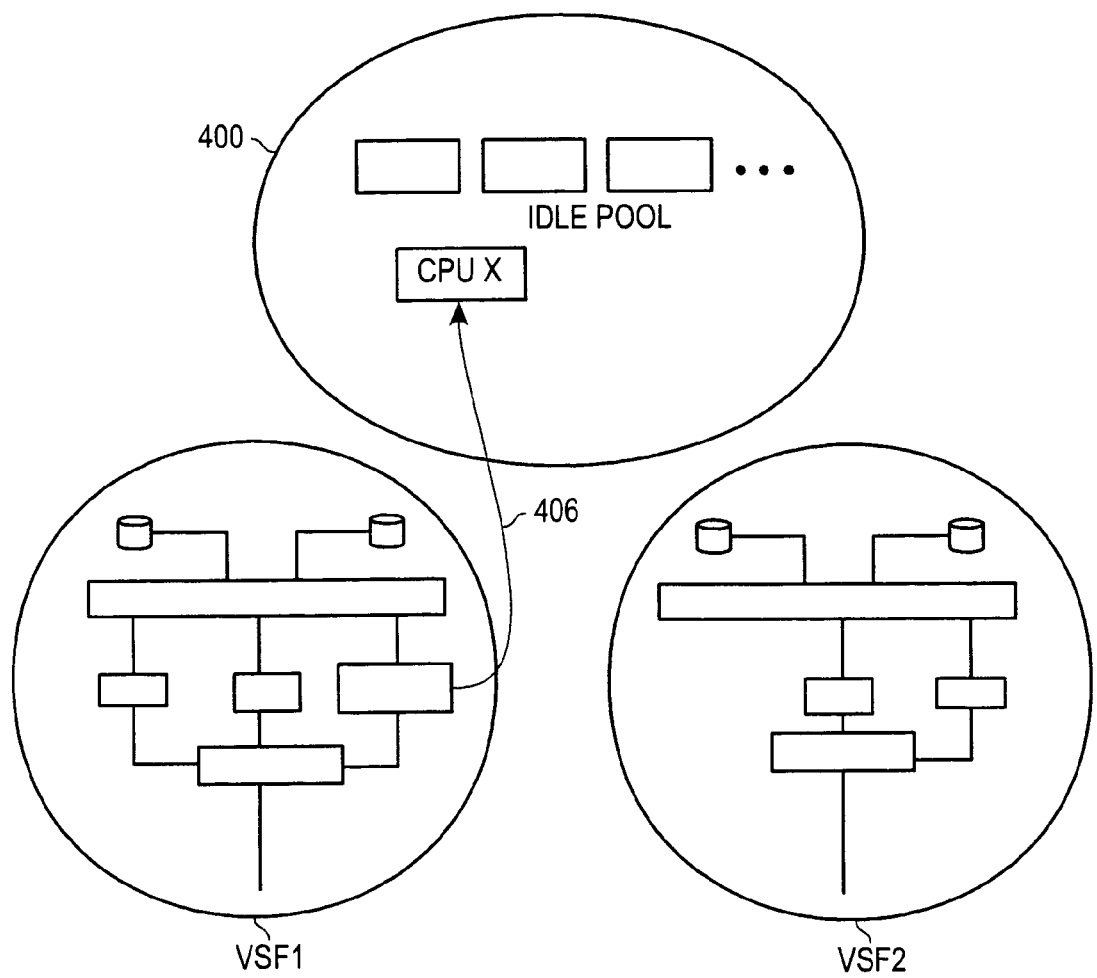
Figure 4D:
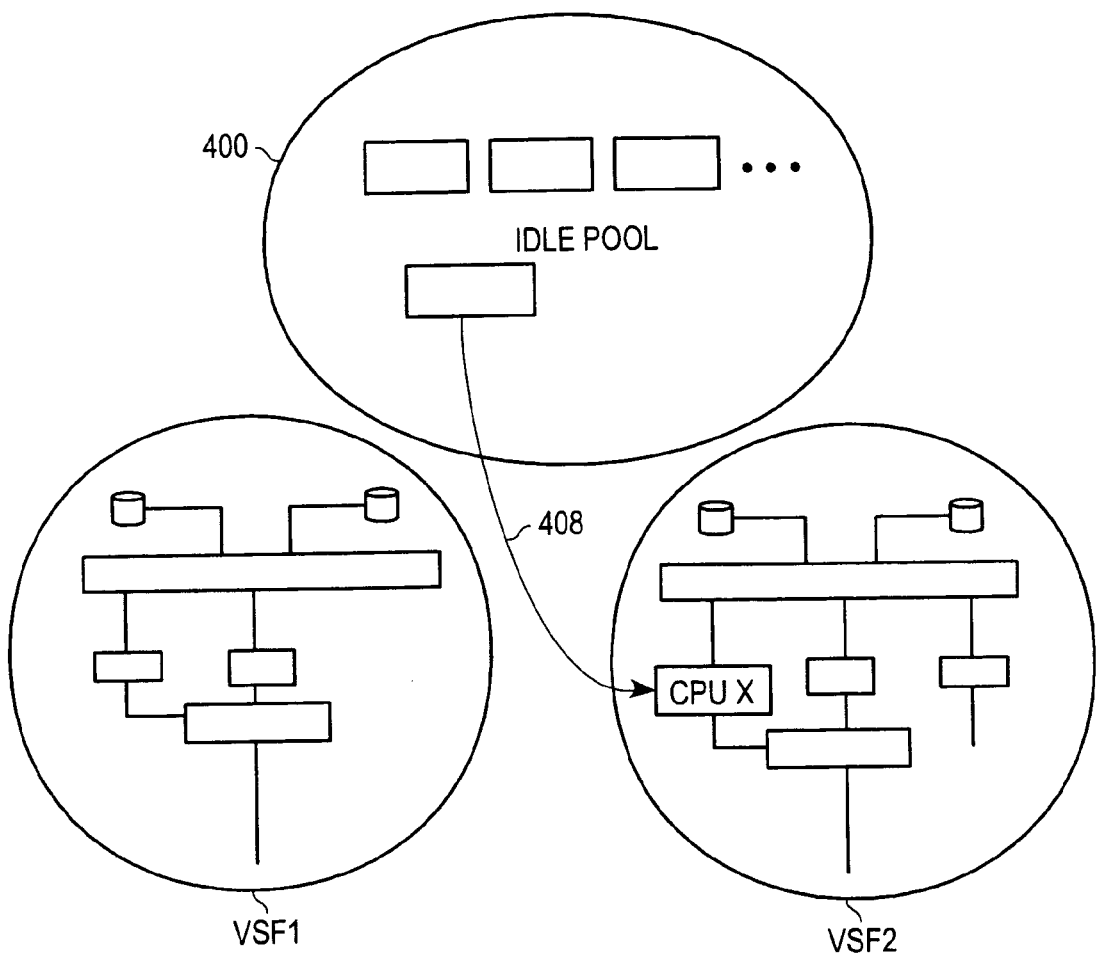

In FIG. 4C, VSF1 no longer needs CPUX, and therefore the Control Plane moves CPUX out of VSF1 and back into the Idle Pool 400. In FIG. 4D, VSF2 has developed a need for an additional computing element. Accordingly, the Control Plane moves CPUX from the Idle Pool 400 to VSF2. Thus, over the course of time, as traffic conditions change, a single computing element may belong to the Idle Pool (FIG. 4A), then be assigned to a particular VSF (FIG. 4B), then be placed back in the Idle Pool (FIG. 4C), and then belong to another VSF (FIG. 4D).

At each one of these stages, The Control Plane configures the LAN switches and SAN switches associated with that computing element to be part of the VLANs and SAN zones associated with a particular VSF (or the Idle Pool). According to one embodiment, in between each transition, the computing element is powered down or rebooted. When it is powered back up, it views a different portion of storage zone on the SAN, which includes a bootable image of an operating system (e.g., Linux, NT, Solaris, etc.). The storage zone also includes a data portion that is specific to each organization (e.g., files associated with a Web server, database partitions, etc.). It is also part of another VLAN which is part of the VLAN set of another VSF, so it can access CPUs, SAN storage devices and NAS devices associated with the VLANs of the VSF into which it has been transitioned.

In a preferred embodiment, the storage zones include a plurality of pre-defined logical blueprints that are associated with roles that may be assumed by the computing elements. Initially, no computing element is dedicated to any particular role or task such as Web server, application server, database server, etc. The role of the computing element is acquired from one of a plurality of pre-defined, stored blueprints, each of which defines a boot image for the computing elements that are associated with that role. The blueprints may be stored in the form of a file, a database table, or any other storage format that can associate a boot image location with a role.

Thus, the movements of CPUX in FIG. 4A, FIG. 4B, FIG. 4C, FIG. 4D are logical, not physical, and are accomplished by re-configuring VLAN switches and SAN Zones under control of The Control Plane. Further, each computing element in the computing grid initially is essentially fungible, and assumes a specific processing role only after it is connected in a virtual server farm and loads software from a boot image. No computing element is dedicated to any particular role or task such as Web server, application server, database server, etc. The role of the computing element is acquired from one of a plurality of pre-defined, stored blueprints, each of which is associated with a role, each of which defines a boot image for the computing elements that are associated with that role.

Since there is no long-lived state information stored in any given computing element (such as a local disk), nodes are easily moved between different VSFs, and can run completely different OS and application software. This also makes each computing element highly replaceable, in case of planned or unplanned downtime.

A particular computing element may perform different roles as it is brought into and out of various VSFs. For example, a computing element may act as a Web server in one VSF, and when it is brought into a different VSF, it may be a database server, a Web load balancer, a Firewall, etc. It may also successively boot and run different operating systems such as Linux, NT or Solaris in different VSFs. Thus, each computing element in the computing grid is fungible, and has no static role assigned to it. Accordingly, the entire reserve capacity of the computing grid can be used to provide any of the services required by any VSF. This provides a high degree of availability and reliability to the services provided by a single VSF, because each server performing a particular service has potentially thousands of back-up servers able to provide the same service.

Further, the large reserve capacity of the computing grid can provide both dynamic load balancing properties, as well as high processor availability. This capability is enabled by the unique combination of diskless computing elements interconnected via VLANs, and connected to a configurable zone of storage devices via a SAN, all controlled in real-time by The Control Plane. Every computing element can act in the role of any required server in any VSF, and can connect to any logical partition of any disk in the SAN. When the grid requires more computing power or disk capacity, computing elements or disk storage is manually added to the idle pool, which may decrease over time as more organizations are provided VSF services. No manual intervention is required in order to increase the number of CPUs, network and disk bandwidth and storage available to a VSF. All such resources are allocated on demand from CPU, network and disk resources available in the Idle Pool by the Control Plane.

A particular VSF is not subjected to manual reconfiguration. Only the machines in the idle pool are manually configured into the computing grid. As a result, a great potential hazard present in current manually constructed server farms is removed. The possibility that human error in configuring a new server into a live server farm can cause the server farm to malfunction, possibly resulting in loss of service to users of that Web site, is virtually eliminated.

The Control Plane also replicates data stored in SAN attached storage devices, so that failure of any particular storage element does not cause a loss of service to any part of the system. By decoupling long-lived storage from computing devices using SANs, and by providing redundant storage and computing elements, where any computing element can be attached to any storage partition, a high degree of availability is achieved.

Figure 5A:
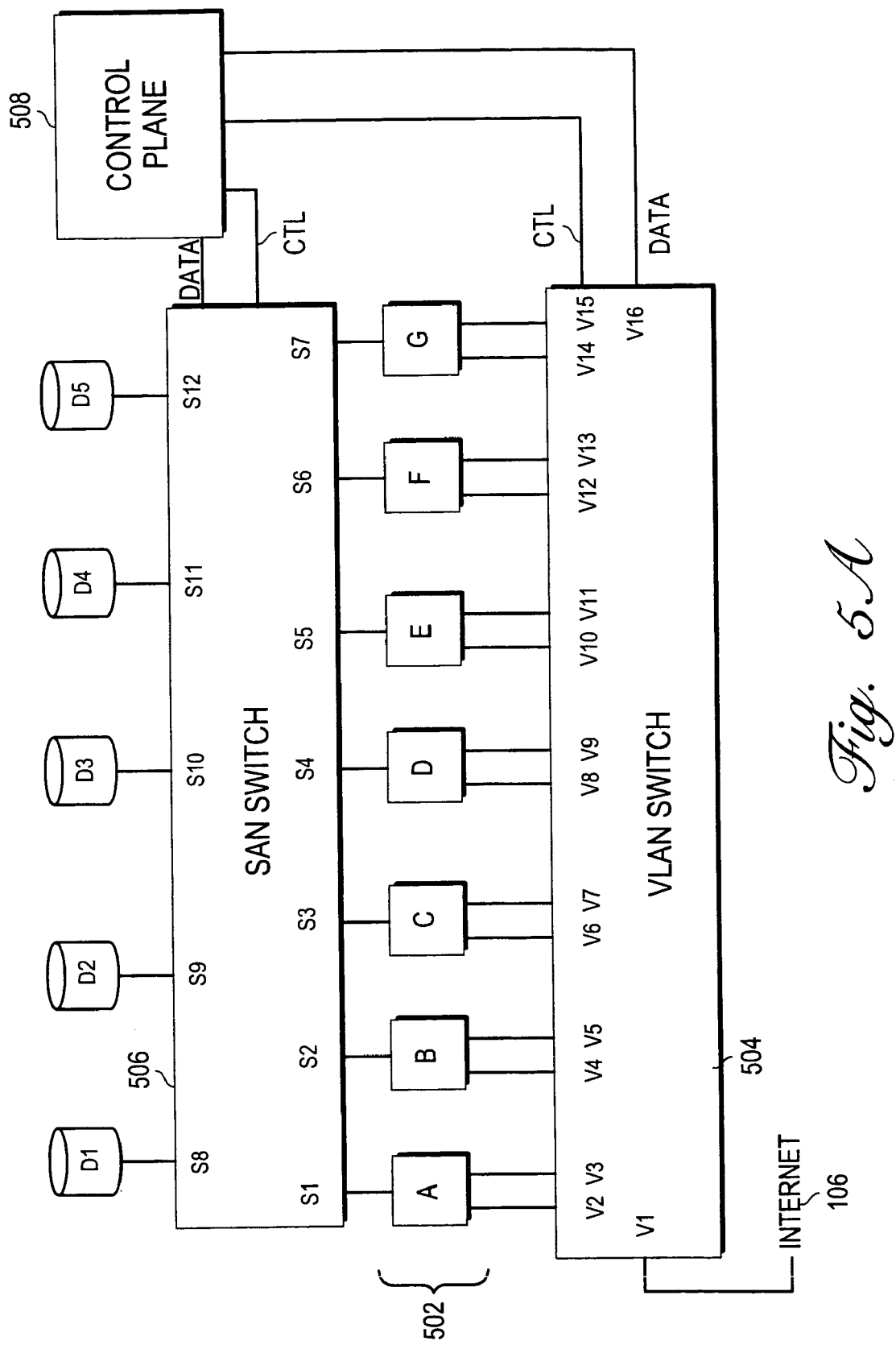
FIG. 5A is a block diagram of an embodiment of a virtual server farm system, computing grid, and supervisory mechanism.

A Detailed Example of Establishing A Virtual Server Farm, Adding a Processor to it, and Removing a Processor from it FIG. 5A is a block diagram of a VSF system according to an embodiment. With reference to FIG. 5A, the following describes the detailed steps that may be used to create a VSF, add nodes to it and delete nodes from it.

FIG. 5A depicts computing elements 502, comprising computers A through G, coupled to VLAN capable switch 504. VLAN switch 504 is coupled to Internet 106, and the VLAN switch has ports V1, V2, etc. Computers A through G are further coupled to SAN switch 506, which is coupled to a plurality of storage devices or disks D1-D5. The SAN switch 506 has ports S1, S2, etc. A Control Plane machine 508 is coupled by control paths and data paths to SAN switch 506 and to VLAN switch 504. The Control Plane is able to send control commands to these devices through the control ports.

For the sake of simplicity and exposition, the number of computing elements in FIG. 5A is a small number. In practice, a large number of computers, e.g., thousands or more, and an equally large number of storage devices form the computing grid. In such larger structures, multiple SAN switches are interconnected to form a mesh, and multiple VLAN switches are interconnected to form a VLAN mesh. For clarity and simplicity, however, FIG. 5A shows a single SAN switch and a single VLAN switch.

Initially, all computers A-G are assigned to the idle pool until the Control Plane receives a request to create a VSF. All ports of the VLAN switch are assigned to a specific VLAN which we shall label as VLAN I (for the idle zone). Assume that the Control Plane is asked to construct a VSF, containing one load balancer/firewall and two Web servers connected to a storage device on the SAN. Requests to Control Plane may arrive through a management interface or other computing element.

In response, the Control Plane assigns or allocates CPU A as the load balancer/firewall, and allocates CPUs B and C as the Web servers. CPU A is logically placed in SAN Zone 1, and pointed to a bootable partition on a disk that contains dedicated load balancing/firewalling software. The term "pointed to" is used for convenience and is intended to indicate that CPU A is given, by any means, information sufficient to enable CPU A to obtain or locate appropriate software that it needs to operate. Placement of CPU A in SAN Zone 1 enables CPU A to obtain resources from disks that are controlled by the SAN of that SAN Zone.

The load balancer is configured by the Control Plane to know about CPUs B and C as the two Web servers it is supposed to load balance. The firewall configuration protects CPUs B and C against unauthorized access from the Internet 106. CPUs B and C are pointed to a disk partition on the SAN that contains a bootable OS image for a particular operating system (e.g., Solaris, Linux, NT etc) and Web server application software (e.g., Apache). The VLAN switch is configured to place ports v1 and v2 on VLAN 1, and ports v3, v4, v5, v6 and v7 on VLAN 2. The Control Plane configures the SAN switch 506 to place Fibre-Channel switch ports s2, s3 and s8 into SAN zone 1.

A description of how a CPU is pointed to a particular disk drive, and what this means for booting up and shared access to disk data, is provided further herein.

Figure 6:
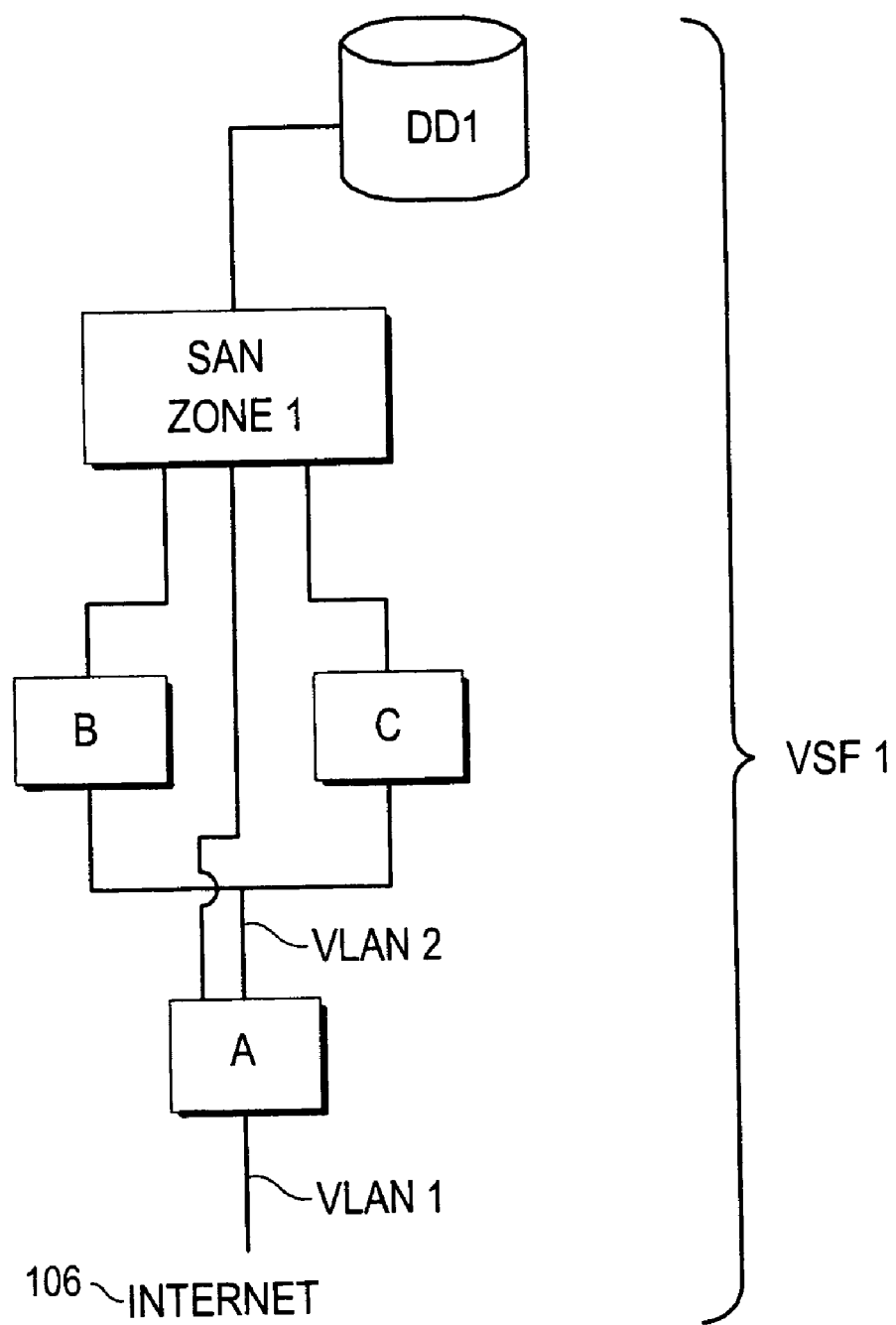
FIG. 6 is a block diagram of logical connections of a virtual server farm.

FIG. 6 is a block diagram of the resulting the logical connectivity of computing elements, which are collectively called VSF 1. Disk drive DD1 is selected from among storage devices D1, D2, etc. Once the logical structure as shown in FIG. 6 is achieved, CPUs A, B, C are given a power-up command. In response, CPU A becomes a dedicated load balancer/firewall machine, and CPUs B, C become Web servers.

Now, assume that because of a policy based rule, the Control Plane determines that another Web server is required in VSF 1. This could be because there are an increased number of requests coming to the Web site, and the customers plan permits at least three Web servers to be added to VSF 1. Or it may be because the organization that owns or operates the VSF wants another server, and has added it through an administrative mechanism, such as a privileged Web page which allows it to add more servers to its VSF.

In response, the Control Plane decides to add CPU D to VSF 1. In order to do this, the Control Plane will add CPU D to VLAN 2 by adding ports v8 and v9 to VLAN 2. Also, CPU D's SAN port s4 is added to SAN zone 1. CPU D is pointed to a bootable portion of the SAN storage which boots up and runs as a Web server. CPU D also gets read-only access to the shared data on the SAN, which may consist of Web page contents, executable server scripts, etc. This way it is able to serve Web requests intended for the server farm much as CPUs B and C serve requests. The Control Plane will also configure the load balancer (CPU A) to include CPU D as part of the server set which is being load balanced.

Figure 7:
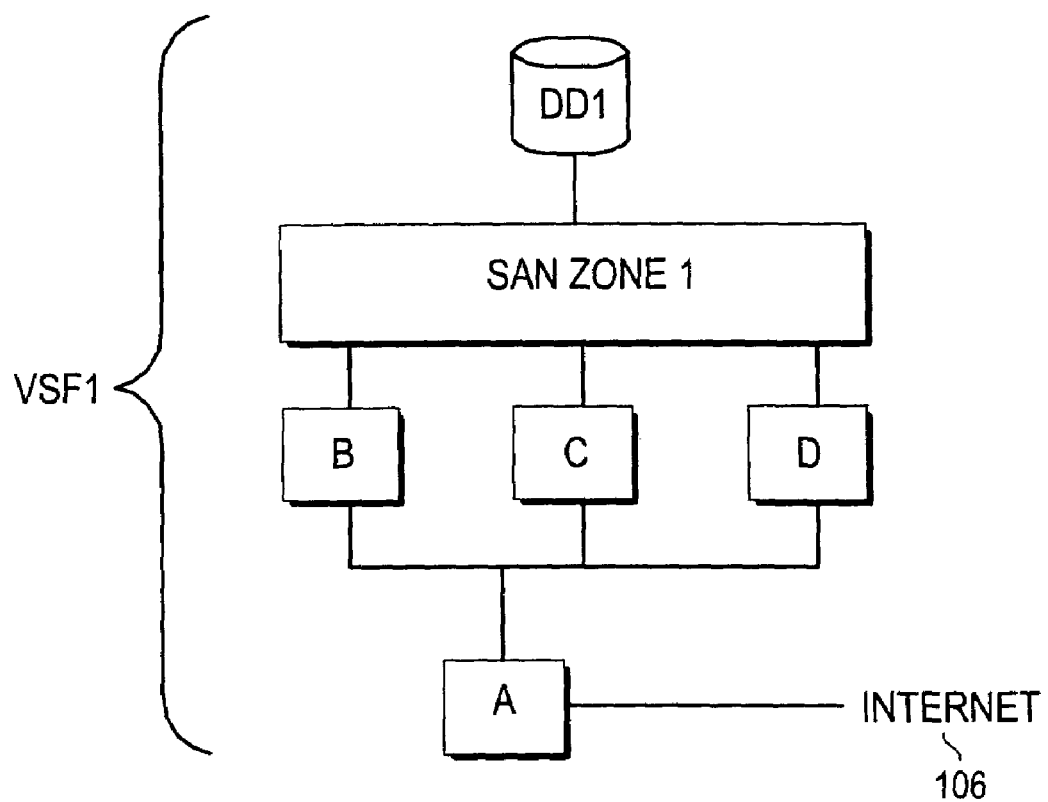
FIG. 7 is a block diagram of logical connections of a virtual server farm.

CPU D is now booted up, and the size of the VSF has now increased to three Web servers and 1 load balancer. FIG. 7 is a block diagram of the resulting logical connectivity.

Assume that the Control Plane now receives a request to create another VSF, which it will name VSF 2, and which needs two Web servers and one load balancer/firewall. The Control Plane allocates CPU E to be the load balancer/firewall and CPUs F, G to be the Web servers. It configures CPU E to know about CPUs F, G as the two machines to load balance against.

To implement this configuration, the Control Plane will configure VLAN switch 504 to include port v10, v11 in VLAN 1 (that is, connected to the Internet 106) and ports v12, v13 and v14; v15 to be in VLAN 3. Similarly, it configures SAN switch 506 to include SAN ports s6 and s7 and s9 in SAN zone 2. This SAN zone includes the storage containing the software necessary to run CPU E as a load-balancer and CPUs F and G as Web servers that use a shared read-only disk partition contained in Disk D2 in SAN zone 2.

Figure 8:
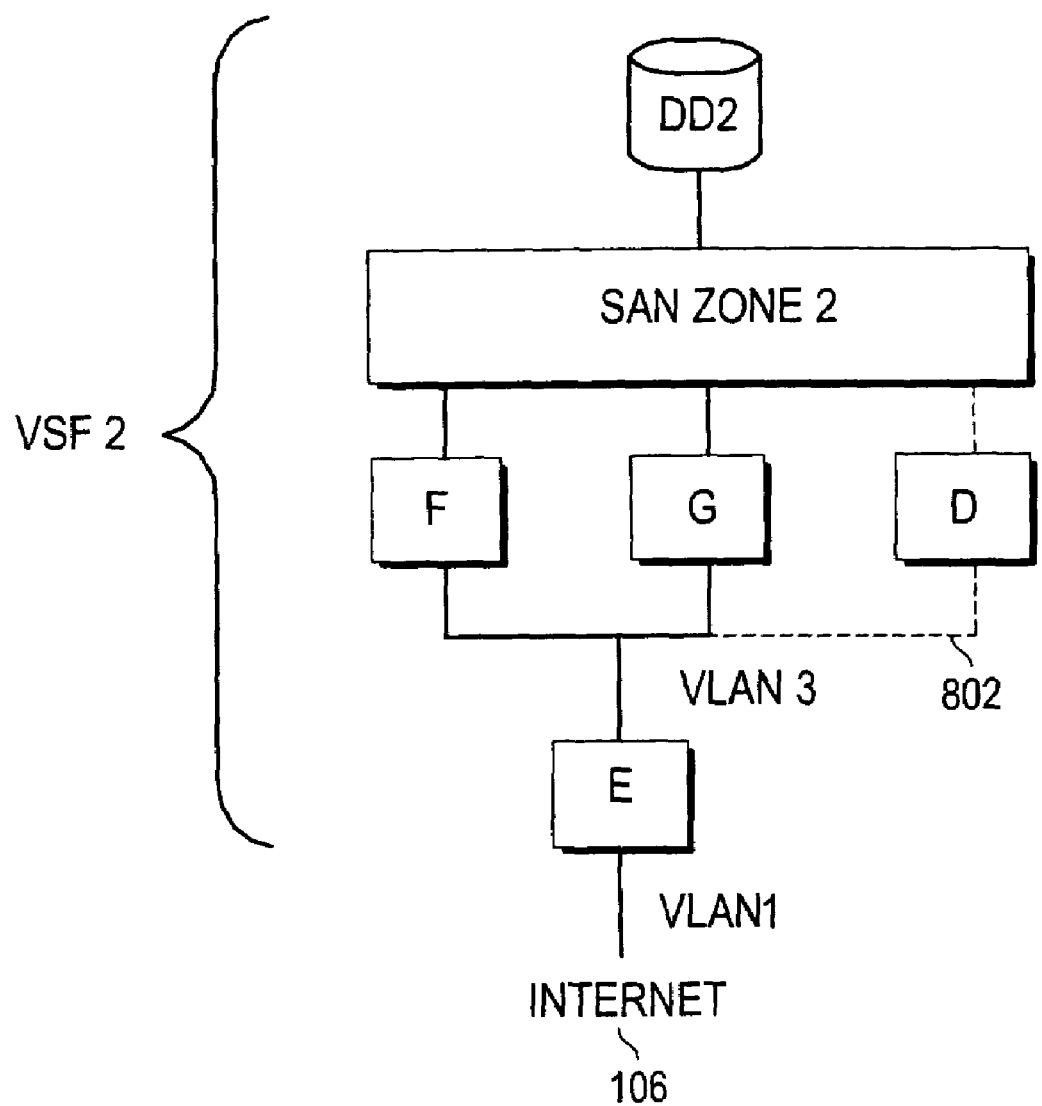
FIG. 8 is a block diagram of logical connections of a virtual server farm.

FIG. 8 is a block diagram of the resulting logical connectivity. Although two VSFs (VSF 1, VSF 2) share the same physical VLAN switch and SAN switch, the two VSFs are logically partitioned. Users who access CPUs B, C, D, or the enterprise that owns or operates VSF 1 can only access the CPUs and storage of VSF 1. Such users cannot access the CPUs or storage of VSF 2. This occurs because of the combination of the separate VLANs and the 2 firewalls on the only shared segment (VLAN 1), and the different SAN zones in which the two VSFs are configured.

Further assume that later, the Control Plane decides that VSF 1 can now fall back down to two Web servers. This may be because the temporary increase in load on VSF 1 has decreased, or it may be because of some other administrative action taken. In response, the Control Plane will shut down CPU D by a special command which may include powering down the CPU. Once the CPU has shut down, the Control Plane removes ports v8 and v9 from VLAN 2, and also removes SAN port s4 from SAN zone 1. Port s4 is placed in an idle SAN zone. The idle SAN zone may be designated, for example, SAN Zone I (for Idle) or Zone 0.

Some time later, the Control Plane may decide to add another node to VSF 2. This may be because the load on the Web servers in VSF 2 has temporarily increased or it may be due to other reasons. Accordingly, the Control Plane decides to place CPU D in VSF 2, as indicated by dashed path 802. In order to do this, it configures the VLAN switch to include ports v8, v9 in VLAN 3 and SAN port s4 in SAN zone 2. CPU D is pointed to the portion of the storage on disk device 2 that contains a bootable image of the OS and Web server software required for servers in VSF 2. Also, CPU D is granted read-only access to data in a file system shared by the other Web servers in VSF 2. CPU D is powered back up, and it now runs as a load-balanced Web server in VSF 2, and can no longer access any data in SAN zone 1 or the CPUs attached to VLAN 2. In particular, CPU D has no way of accessing any element of VSF 1, even though at an earlier point in time it was part of VSF 1.

Further, in this configuration, the security perimeter enforced by CPU E has dynamically expanded to include CPU D. Thus, embodiments provide dynamic firewalling that automatically adjusts to properly protect computing elements that are added to or removed from a VSF.

Disk Devices on the SAN

There are several ways by which a CPU can be pointed to a particular device on the SAN, for booting up purposes, or for accessing disk storage which needs to be shared with other nodes, or otherwise provided with information about where to find bootup programs and data.

One way is to use a SCSI-to-Fibre Channel bridging device attached to a computing element and provide a SCSI interface for the local disks. By routing that SCSI port to the right drive on the Fibre-Channel SAN, the computer can access the storage device on the Fibre-Channel SAN just as it would access a locally attached SCSI disk. Therefore, software such as boot-up software simply boots off the disk device on the SAN just as it would boot off a locally attached SCSI disk.

Another way is to have a Fibre-Channel interface on the node and associated device-driver and boot ROM and OS software that permits the Fibre-Channel interface to be used as a boot device.

Yet another way is to have an interface card (e.g. PCI bus or Sbus) which appears to be a SCSI or IDE device controller but that in turn communicates over the SAN to access the disk. Operating systems such as Solaris and Windows NT integrally provide diskless boot functions that can be used in this alternative.

Typically there will be two kinds of SAN disk devices associated with a given node. The first is one which is not logically shared with other computing elements, and constitutes what is normally a per-node root partition containing bootable OS images, local configuration files, etc. This is the equivalent of the root filesystem on a Unix system.

The second kind of disk is shared storage with other nodes. The kind of sharing varies by the OS software running on the CPU and the needs of the nodes accessing the shared storage. If the OS provides a cluster file system that allows read/write access of a shared-disk partition between multiple nodes, the shared disk is mounted as such a cluster file system. Similarly, the system may use database software such as Oracle Parallel Server that permits multiple nodes running in a cluster to have concurrent read/write access to a shared disk. In such cases, a shared disk is already designed into the base OS and application software.

For operating systems where such shared access is not possible, because the OS and associated applications cannot manage a disk device shared with other nodes, the shared disk can be mounted as a read-only device. For many Web applications, having read-only access to Web related files is sufficient. For example, in Unix systems, a particular filesystem may be mounted as read-only.

Multi-Switch Computing Grid

The configuration described above in connection with FIG. 5A can be expanded to a large number of computing and storage nodes by interconnecting a plurality of VLAN switches to form a large switched VLAN fabric, and by interconnecting multiple SAN switches to form a large switched SAN mesh. In this case, a computing grid has the architecture generally shown in FIG. 4, except that the SAN/VLAN switched mesh contains a very large number of ports for CPUs and storage devices. A number of machines running the Control Plane can be physically connected to the control ports of the VLAN/SAN switches, as described further below. Interconnection of multiple VLAN switches to create complex multi-campus data networks is known in this field. See, for example, G. Haviland, "Designing High-Performance Campus Intranets with Multilayer Switching," Cisco Systems, Inc., available online at http://www.cisco.com/warp/public/cc/sol/mkt/ent/ndsgn/highd_wp.htm

SAN Architecture

The description assumes that the SAN comprises Fibre-Channel switches and disk devices, and potentially Fibre-Channel edge devices such as SCSI-to-Fibre Channel bridges. However, SANs may be constructed using alternative technologies, such as Gigabit Ethernet switches, or switches that use other physical layer protocols. In particular, there are efforts currently underway to construct SANs over IP networks by running the SCSI protocol over IP. The methods and architecture described above is adaptable to these alternative methods of constructing a SAN. When a SAN is constructed by running a protocol like SCSI over IP over a VLAN capable layer 2 environment, then SAN zones are created by mapping them to different VLANs.

Also, Network Attached Storage (NAS) may be used, which works over LAN technologies such as fast Ethernet or Gigabit Ethernet. With this option, different VLANs are used in place of the SAN zones in order to enforce security and the logical partitioning of the computing grid. Such NAS devices typically support network filesystems such as Sun's NSF protocol, or Microsoft's SMB, to allow multiple nodes to share the same storage.

Control Plane Implementation

In the descriptions above, the Control Plane is represented as a box coupled to control and data ports of the SAN/VLAN switches. However, other implementations of Control Plane are contemplated.

Figure 9:
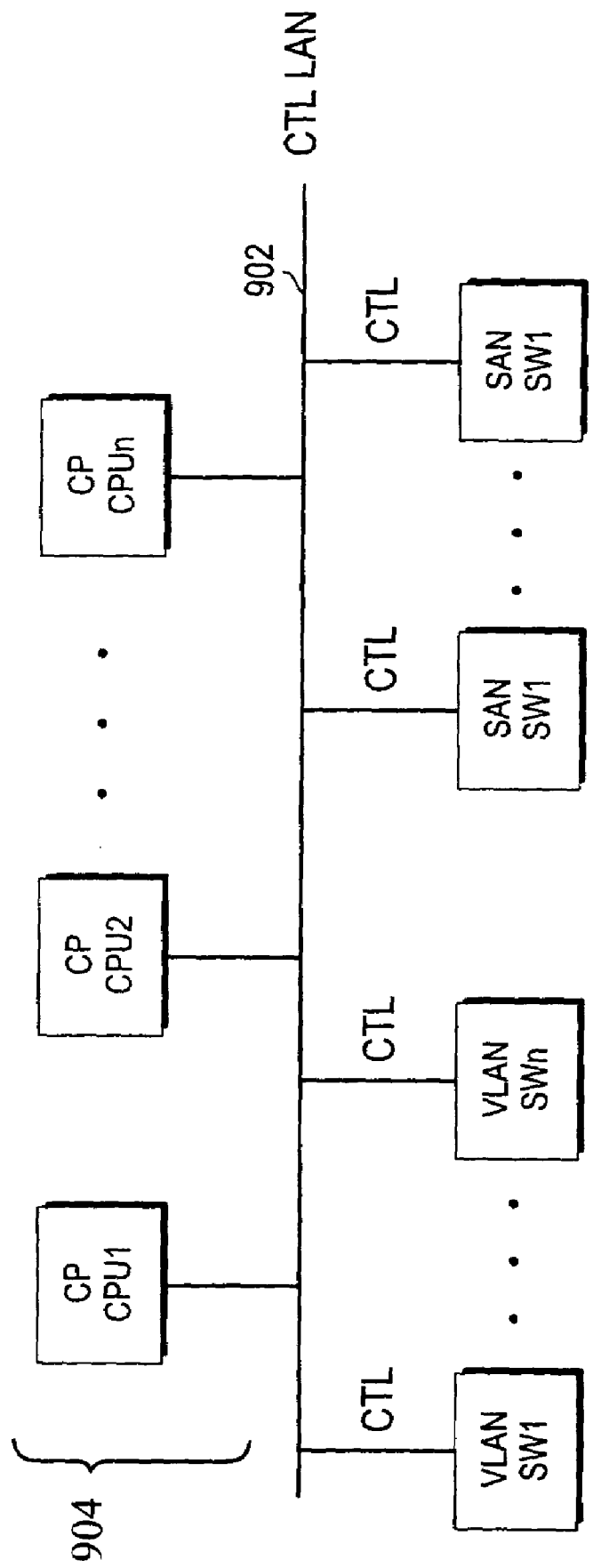
FIG. 9 is a block diagram of a Control Plane server farm.

Typically the SAN/VLAN control ports are Ethernet interfaces. FIG. 9 is a block diagram of an architecture that can be used in such a case. All the control ("CTL") ports of each VLAN switch (VLAN SW1, VLAN SWn) and all the control ports of each SAN switch (SAN SW1, SAN SWn) are placed on a single Ethernet subnet 902. The subnet 902 is connected only to a plurality of Control Plane machines CP CPU1, CP CPU2, etc. This permits multiple Control Plane machines to be connected to the control ports of all the SAN switches and VLAN switches.

In this configuration, the plurality of Control Plane machines are referred to collectively as the Control Plane or CP 904. Only machines in CP 904 have a physical connection to the control ports of the VLAN switches and SAN switches. Accordingly, CPUs in a given VSF cannot change the membership of the VLANs and SAN zones associated with its own VSF or any other VSF.

Alternatively, instead of Ethernet interfaces, the control ports could be serial or parallel ports. In this case, the ports are coupled to the Control Plane machines.

Control Plane Data Connections to VLANS

The machines running the Control Plane need to have access to the data ports on both the VLAN switches as well as the SAN switches. This is required in order for the Control Plane to be able to configure the files related to a particular node and to collect real-time information from a node related to current CPU load, network load, and disk load.

Figure 5B:
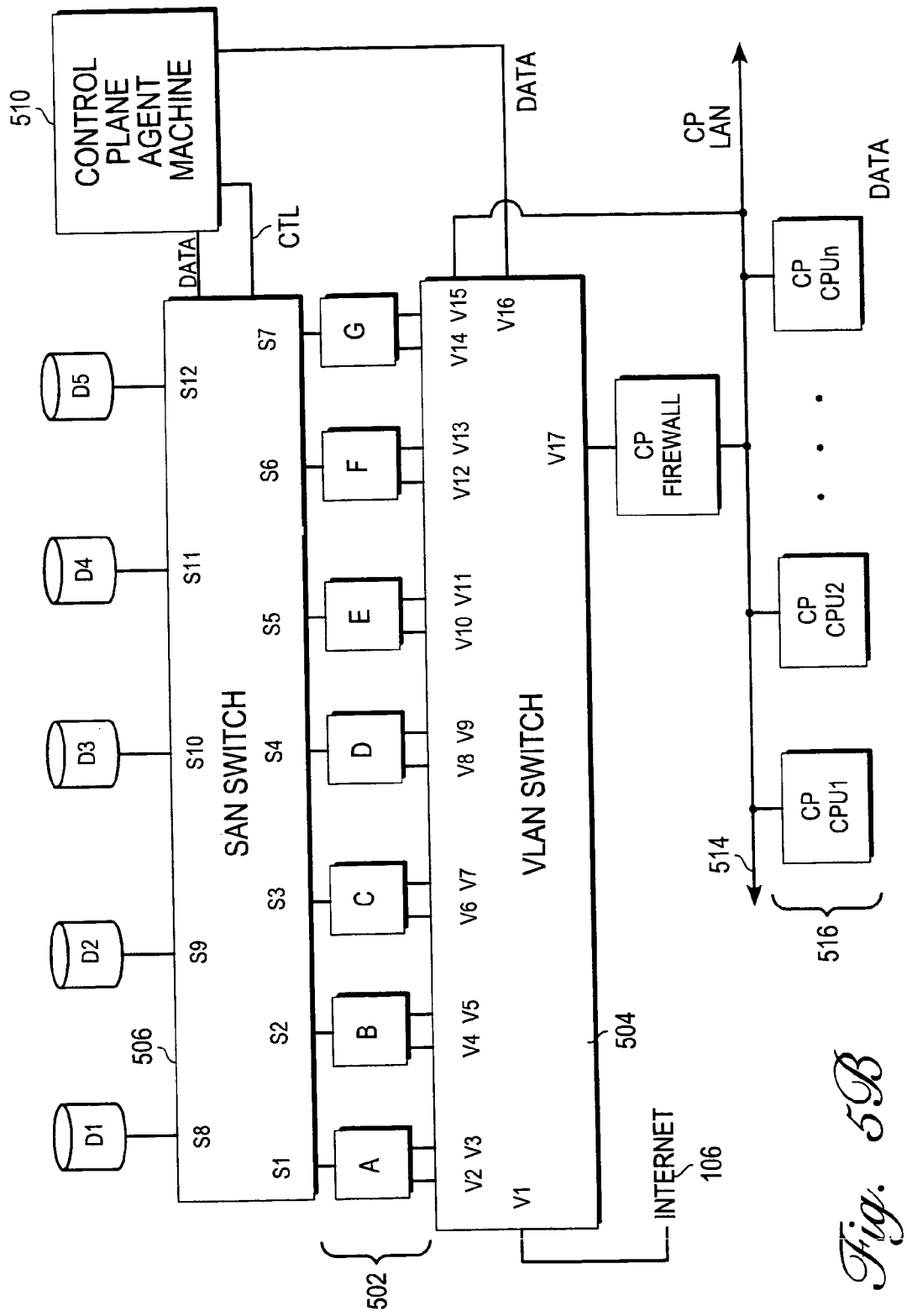
FIG. 5B is a block diagram of a system in which a Supervisor or Control Plane server farm is protected by a firewall.

FIG. 5B is a block diagram of one embodiment showing a configuration for connecting a Control Plane 516 to data ports. In one embodiment, machines in each VSF periodically send a packet to a machine 510 that is acting as an agent for the Control Plane. Alternatively, the Control Plane agent machine 510 can periodically poll the nodes in the VSF for their real-time data. The Control Plane agent machine 510 then sends the data it collects from all the nodes in a VSF to the CP 516. Each machine in CP 516 is coupled to a CP LAN 514. The CP LAN 514 is coupled to a special port V17 of VLAN Switch 504 through a CP firewall 512. This provides a scalable and secure means for the CP to collect all the real-time information from the nodes in all the VSFs.

Control Plane to SAN Data Connections

Figure 10:
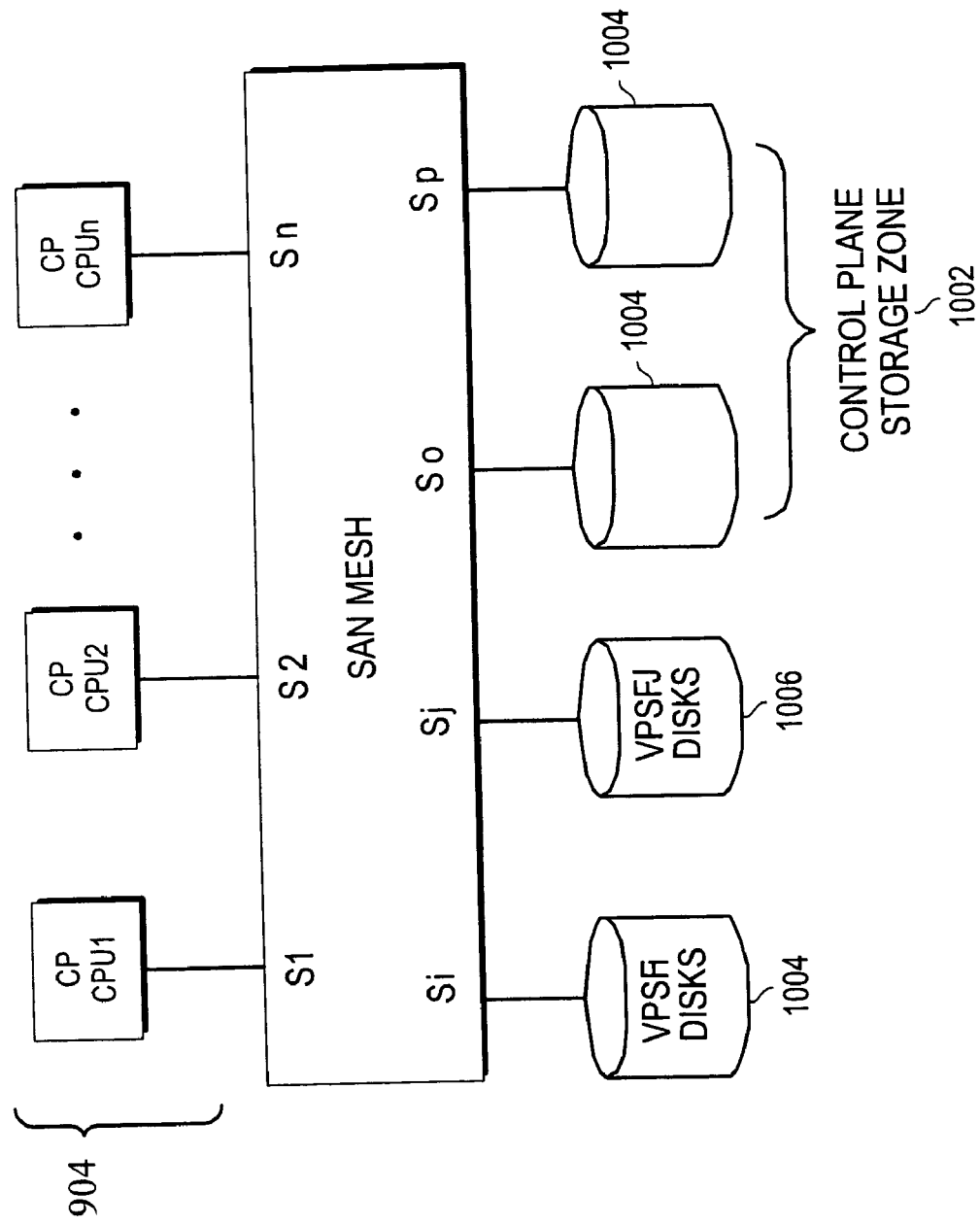
FIG. 10 is a block diagram showing connections of Control Plane machines to an embodiment that uses a plurality of SAN switches ("SAN mesh").

FIG. 10 is a block diagram showing connections of Control Plane machines to an embodiment that uses a plurality of SAN switches ("SAN mesh"). A plurality of Control Plane machines CP CPU1, CP CPU2, etc., form a Control Plane Server Farm (CP) 904. Each Control Plane machine is coupled to a port of the SAN mesh.

Associated with the Control Plane machines is a set of SAN ports So, Sp that are connected to disks 1004 that contain data private to the Control Plane. Disks 1004 are logically located in Control Plane Private Storage Zone 1002, which is an area where the Control Plane maintains log files, statistical data, current Control Plane configuration information, and software that implements the Control Plane. SAN ports So, Sp are only part of the Control Plane SAN zone. Ports So, Sp are never placed on any other SAN zone, and only machines which are part of the CP 904 can access the disks 1004 connected to these ports.

Ports S1, S2 and Sn and ports So and Sp are in the Control Plane SAN zone. No computing element from either the Idle Pool or any VSF is part of the Control Plane SAN zone. This ensures that Control Plane private data is protected from access from any VSF.

When a particular Control Plane machine needs to access a disk partition which is part of a particular VSF, such as VSF I of FIG. 10, then it is placed in the SAN zone associated with that VSF. In this example, CP CPU 2 needs to access the disks of VSF I, so port s2 which is associated with CP CPU 2 is placed in the SAN zone of VSF I, which includes port si. Once the CP CPU is done accessing the disks on port si, it is removed from the SAN zone of VSF I.

Similarly, if a machine such as CP CPU 1 needs to access the disks of VSF j, then it is placed in the SAN zone associated with VSF j. As a result, port s2 is placed in the SAN zone associated with VSF j, which includes the zone containing port sj. Once CP 1 is done accessing the disks connected to port sj, it is removed from the SAN zone associated with VSF j.

Control Plane to VLAN Data Connections

Control Plane machines need to collect information from the computing nodes, such as real-time load related information. In order to do this Control Plane needs to have network connectivity to the nodes in the grid itself.

A Wide Area Computing Grid

The VSF described above can be distributed over a WAN in several ways.

In one alternative, a wide area backbone may be based on Asynchronous Transfer Mode (ATM) switching. In this case, each local area VLAN is extended into a wide area using Emulated LANs (ELANs) which are part of the ATM LAN Emulation (LANE) standard. In this way, a single VSF can span across several wide area links, such as ATM/SONET/

OC-12 links. An ELAN becomes part of a VLAN which extends across the ATM WAN.

Alternatively, a VSF is extended across a WAN using a VPN system. In this embodiment, the underlying characteristics of the network become irrelevant, and the VPN is used to interconnect two or more VSFs across the WAN to make a single distributed VSF.

Data mirroring technologies can be used in order to have local copies of the data in a distributed VSF. Alternatively, the SAN is bridged over the WAN using one of several SAN to WAN bridging techniques, such as SAN-to-ATM bridging or SAN-to-Gigabit Ethernet bridging. SANs constructed over IP networks naturally extend over the WAN since IP works well over such networks.

Figure 11:
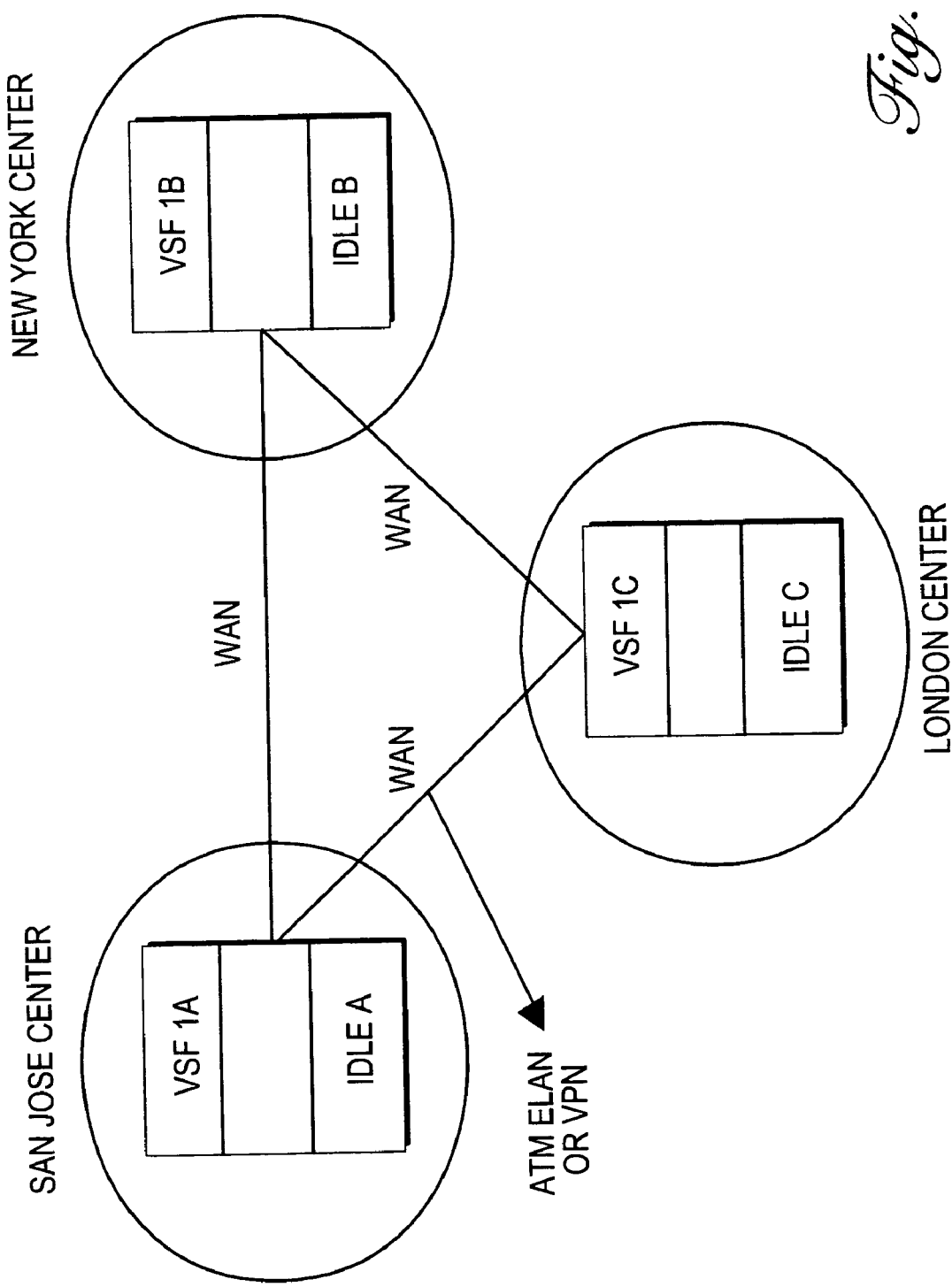
FIG. 11 is a block diagram of a plurality of VSFs extended over WAN connections.

FIG. 11 is a block diagram of a plurality of VSFs extended over WAN connections. A San Jose Center, New York Center, and London center are coupled by WAN connections. Each WAN connection comprises an ATM, ELAN, or VPN connection in the manner described above. Each center comprises at least one VSF and at least one Idle Pool. For example, the San Jose center has VSF1A and Idle Pool A. In this configuration, the computing resources of each Idle Pool of a center are available for allocation or assignment to a VSF located in any other center. When such allocation or assignment is carried out, a VSF becomes extended over the WAN.

Example Uses of VSFS

The VSF architecture described in the examples above may be used in the context of Web server system. Thus, the foregoing examples have been described in terms of Web servers, application servers and database servers constructed out of the CPUs in a particular VSF. However, the VSF architecture may be used in many other computing contexts and to provide other kinds of services; it is not limited to Web server systems.

A Distributed VSF as Part of a Content Distribution Network

In one embodiment, a VSF provides a Content Distribution Network (CDN) using a wide area VSF.

The CDN is a network of caching servers that performs distributed caching of data. The network of caching servers may be implemented, for example, using TrafficServer (TS) software commercially available from Inktomi Corporation, San Mateo, Calif. TS is a cluster aware system; the system scales as more CPUs are added to a set of caching Traffic Server machines. Accordingly, it is well suited to a system in which adding CPUs is the mechanism for scaling upwards.

In this configuration, a system can dynamically add more CPUs to that portion of a VSF that runs caching software such as TS, thereby growing the cache capacity at a point close to where bursty Web traffic is occurring. As a result, a CDN may be constructed that dynamically scales in CPU and I/O bandwidth in an adaptive way.

A VSF for Hosted Intranet Applications

There is growing interest in offering Intranet applications such as Enterprise Resource Planning (ERP), ORM and CRM software as hosted and managed services. Technologies such as Citrix WinFrame and Citrix MetaFrame allow an enterprise to provide Microsoft Windows applications as a service on a thin client such as a Windows CE device or Web browser. A VSF can host such applications in a scalable manner.

For example, the SAP R/3 ERP software, commercially available from SAP Aktiengesellschaft of Germany, allows an enterprise to load balance using multiple Application and Database Servers. In the case of a VSF, an enterprise would dynamically add more Application Servers (e.g., SAP Dialog Servers) to a VSF in order to scale up the VSF based on real-time demand or other factors.

Similarly, Citrix Metaframe allows an enterprise to scale up Windows application users on a server farm running the hosted Windows applications by adding more Citrix servers. In this case, for a VSF, the Citrix MetaFrame VSF would dynamically add more Citrix servers in order to accommodate more users of Metaframe hosted Windows applications.

It will be apparent that many other applications may be hosted in a manner similar to the illustrative examples described above.

Customer Interaction with a VSF

Since a VSF is created on demand, a VSF customer or organization that "owns" the VSF may interact with the system in various ways in order to customize a VSF. For example, because a VSF is created and modified instantly via the Control Plane, the VSF customer may be granted privileged access to create and modify its VSF itself. The privileged access may be provided using password authentication provided by Web pages and security applications, token card authentication, Kerberos exchange, or other appropriate security elements.

In one exemplary embodiment, a set of Web pages are served by the Control Plane machine, or by a separate server. The Web pages enable a customer to create a custom VSF, by specifying a number of tiers, the number of computing elements in a particular tier, the hardware and software platform used for each element, and things such as what kind of Web server, application server, or database server software should be pre-configured on these computing elements. Thus, the customer is provided with a virtual provisioning console.

After the customer or user enters such provisioning information, the Control Plane parses and evaluates the order and queues it for execution. Orders may be reviewed by human managers to ensure that they are appropriate. Credit checks of the enterprise may be run to ensure that it has appropriate credit to pay for the requested services. If the provisioning order is approved, the Control Plane may configure a VSF that matches the order, and return to the customer a password providing root access to one or more of the computing elements in the VSF. The customer may then upload master copies of applications to execute in the VSF.

When the enterprise that hosts the computing grid is a for-profit enterprise, the Web pages may also receive payment related information, such as a credit card, a PO number, electronic check, or other payment method.

In another embodiment, the Web pages enable the customer to choose one of several VSF service plans, such as automatic growth and shrinkage of a VSF between a minimum and maximum number of elements, based on real-time load. The customer may have a control value that allows the customer to change parameters such as minimum number of computing elements in a particular tier such as Web servers, or a time period in which the VSF must have a minimal amount of server capacity. The parameters may be linked to billing software that would automatically adjust the customer's bill rate and generate billing log file entries.

Through the privileged access mechanism the customer can obtain reports and monitor real-time information related to usage, load, hits or transactions per second, and adjust the characteristics of a VSF based on the real-time information.

It will be apparent that the foregoing features offer significant advantages over conventional manual approaches to constructing a server farm. In the conventional approaches, a user cannot automatically influence server farm's properties without going through a cumbersome manual procedure of adding servers and configuring the server farm in various ways.

Billing Models for a VSF

Given the dynamic nature of a VSF, the enterprise that hosts the computing grid and VSFs may bill service fees to customers who own VSFs using a billing model for a VSF which is based on actual usage of the computing elements and storage elements of a VSF. It is not necessary to use a flat fee billing model. The VSF architecture and methods disclosed herein enable a "pay-as-you-go" billing model because the resources of a given VSF are not statically assigned. Accordingly, a particular customer having a highly variable usage load on its server farm could save money because it would not be billed a rate associated with constant peak server capacity, but rather, a rate that reflects a running average of usage, instantaneous usage, etc.

For example, an enterprise may operate using a billing model that stipulates a flat fee for a minimum number of computing elements, such as 10 servers, and stipulates that when real-time load requires more than 10 elements, then the user is billed at an incremental rate for the extra servers, based on how many extra servers were needed and for the length of time that they are needed.

The units of such bills may reflect the resources that are billed. For example, bills may be expressed in units such as MIPS-hours, CPU-hours, thousands of CPU seconds, etc.

A Customer Visible Control Plane API

In another alternative, the capacity of a VSF may be controlled by providing the customer with an application programming interface (API) that defines calls to the Control Plane for changing resources. Thus, an application program prepared by the customer could issue calls or requests using the API to ask for more servers, more storage, more bandwidth, etc. This alternative may be used when the customer needs the application program to be aware of the computing grid environment and to take advantage of the capabilities offered by the Control Plane.

Nothing in the above-disclosed architecture requires the customer to modify its application for use with the computing grid. Existing applications continue to work as they do in manually configured server farms. However, an application can take advantage of the dynamism possible in the computing grid, if it has a better understanding of the computing resources it needs based on the real-time load monitoring functions provided by the Control Plane.

An API of the foregoing nature, which enables an application program to change the computing capacity of a server farm, is not possible using existing manual approaches to constructing a server farm.

Automatic Updating and Versioning

Using the methods and mechanisms disclosed herein, the Control Plane may carry out automatic updating and versioning of operating system software that is executed in computing elements of a VSF. Thus, the end user or customer is not required to worry about updating the operating system with a new patch, bug fix, etc. The Control Plane can maintain a library of such software elements as they are received and automatically distribute and install them in computing elements of all affected VSFs.

Implementation Mechanisms

The computing elements and supervisory mechanism may be implemented in several forms. In one embodiment, each computing element is a general purpose digital computer having the elements shown in FIG. 12 except for non-volatile storage device 1210, and the supervisory mechanism is a general purpose digital computer of the type shown in FIG. 12 operating under control of program instructions that implement the processes described herein.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for implementing the methods, mechanisms and architecture described herein. According to one embodiment of the invention, such methods and mechanisms are implemented by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. In accordance with the invention, one such downloaded application implements the methods and mechanisms described herein.

The received code may be executed by processor 1204 as it is received, and/or stored in storage device 1210, or other non-volatile storage for later execution. In this manner, computer system 1200 may obtain application code in the form of a carrier wave.

Advantages; Scope

The computing grid disclosed herein may be compared conceptually to the public electric power network that is sometimes called the power grid. The power grid provides a scalable means for many parties to obtain power services through a single wide-scale power infrastructure. Similarly, the computing grid disclosed herein provides computing services to many organizations using a single wide-scale computing infrastructure. Using the power grid, power consumers do not independently manage their own personal power equipment. For example, there is no reason for a utility consumer to run a personal power generator at its facility, or in a shared facility and manage its capacity and growth on an individual basis. Instead, the power grid enables the wide-scale distribution of power to vast segments of the population, thereby providing great economies of scale. Similarly, the computing grid disclosed herein can provide computing services to vast segments of the population using a single wide-scale computing infrastructure.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing a computing grid comprising a plurality of computing resources, wherein the plurality of computing resources comprises a plurality of processors and storage devices, the method comprising:

logically partitioning at least a portion of the computing grid into a plurality of partitions, wherein each partition comprises a subset of the plurality of computing resources;

dynamically changing a number of computing resources logically assigned to a particular partition from the plurality of partitions;

assigning a first partition from the plurality of partitions to a first user;

assigning a second partition from the plurality of partitions to a second user; and providing secure access to the first partition and the second partition to allow the first user to access the first partition but not the second partition and the second user to access the second partition but not the first partition, wherein the step of providing secure access is performed using virtual local area network switches, wherein logically partitioning at least a portion of the computing grid into a plurality of partitions further comprises generating instructions to logically couple together the subset of computing resources within each of the plurality of partitions, and wherein logically partitioning at least a portion of the computing grid into a plurality of partitions is performed through a plurality of control ports associated with the plurality of computing resources such that the plurality of computing resources in the computing grid are unable to access computing resources which they are not authorized to access.

2. The method of claim 1, wherein computing resources in the subset of computing resources associated with the first partition do not have access to computing resources in the subset of computing resources associated with the second partition.

3. The method of claim 1, wherein logically partitioning at least a portion of the computing grid into a plurality of partitions, is performed through a control plane, wherein the control plane comprises a plurality of control ports associated with the plurality of computing resources, and the plurality of control ports manages membership of the plurality of computing resources within a particular partition.

4. The method of claim 1, wherein dynamically changing a number of computing resources logically assigned to the particular partition from the plurality of partitions includes adding an additional computing resource to the subset of computing resources assigned to the particular partition.

5. The method of claim 4, further comprising removing the additional computing resource from another partition from the plurality of partitions.

6. The method of claim 4, wherein the additional computing resource is not currently associated with any of the plurality of partitions.

7. The method of claim 4, further comprising configuring the additional computing resource in accordance with an intended role of the additional computing resource in the particular partition.

8. The method of claim 4, wherein adding an additional computing resource to the subset of computing resources assigned to the particular partition includes selecting, from among a set of processors, an additional processor; and
generating instructions that logically couple the additional processor to the subset of computing resources assigned to the particular partition.

9. The method of claim 1, wherein dynamically changing a number of computing resources logically assigned to the particular partition from the plurality of partitions includes removing a particular computing resource from the subset of computing resources assigned to the particular partition.

10. The method of claim 9, wherein removing a particular computing resource from the subset of computing resources assigned to the particular partition includes generating instructions that cause a particular processor to be logically decoupled from the subset of computing resources assigned to the particular partition.

11. The method of claim 1, wherein a non-partition portion of the computing grid includes a subset of the plurality of computing resources.

12. The method of claim 1, further comprising dynamically changing the number of computing resources logically assigned to the particular partition in response to real-time loading experienced by the subset of computing resources assigned to the particular partition.

13. The method of claim 1, further comprising dynamically changing the number of computing resources logically assigned to the particular partition in response to a request by the first user.

14. An apparatus comprising one or more processors for managing a computing grid comprising a plurality of computing resources, wherein the plurality of computing resources comprises a plurality of processors and storage devices, comprising:
means for logically partitioning at least a portion of the computing grid into a plurality of partitions, wherein each partition comprises a subset of the plurality of computing resources;
means for dynamically changing a number of computing resources logically assigned to a particular partition from the plurality of partitions;
means for assigning a first partition from the plurality of partitions to a first user;
means for assigning a second partition from the plurality of partitions to a second user; and
means for providing secure access to the first partition and the second partition to allow the first user to access the first partition but not the second partition and the second user to access the second partition but not the first partition,
wherein the means for providing secure access comprises means for configuring virtual local area networks,
wherein means for logically partitioning at least a portion of the computing grid into a plurality of partitions further comprises means for generating instructions to logically couple together the subset of computing resources within each of the plurality of partitions, and
wherein means for logically partitioning at least a portion of the computing grid into a plurality of partitions is performed through a plurality of control ports associated with the plurality of computing resources such that the plurality of computing resources in the computing grid are unable to access computing resources which they are not authorized to access.

15. The apparatus of claim 14, wherein computing resources in the subset of computing resources associated with the first partition do not have access to computing resources in the subset of computing resources associated with the second partition.

16. The apparatus of claim 14, wherein means for logically partitioning at least a portion of the computing grid into a plurality of partitions, is performed through a control plane, wherein the control plane comprises a plurality of control ports associated with the plurality of computing resources, and the plurality of control ports manages membership of the plurality of computing resources within a particular partition.

17. The apparatus of claim 14, wherein means for dynamically changing a number of computing resources logically assigned to the particular partition from the plurality of partitions includes means for adding an additional computing resource to the subset of computing resources assigned to the particular partition.

18. The apparatus of claim 17, further comprising means for removing the additional computing resource from another partition from the plurality of partitions.

19. The apparatus of claim 17, wherein the additional computing resource is not currently associated with any of the plurality of partitions.

20. The apparatus of claim 17, further comprising means for configuring the additional computing resource in accordance with an intended role of the additional computing resource in the particular partition.

21. The apparatus of claim 17, wherein means for adding an additional computing resource to the subset of computing resources assigned to the particular partition includes means for selecting, from among a set of processors, an additional processor; and
means for generating instructions that logically couple the additional processor to the subset of computing resources assigned to the particular partition.

22. The apparatus of claim 14, wherein means for dynamically changing a number of computing resources logically assigned to the particular partition from the plurality of partitions includes means for removing a particular computing resource from the subset of computing resources assigned to the particular partition.

23. The apparatus of claim 22, wherein means for removing a particular computing resource from the subset of computing resources assigned to the particular partition includes means for generating instructions that cause a particular processor to be logically decoupled from the subset of computing resources assigned to the particular partition.

24. The apparatus of claim 14, wherein a non-partition portion of the computing grid includes a subset of the plurality of computing resources.

25. The apparatus of claim 14, further comprising means for dynamically changing the number of computing resources logically assigned to the particular partition in response to real-time loading experienced by the subset of computing resources assigned to the particular partition.

26. The apparatus of claim 14, further comprising means for dynamically changing the number of computing resources logically assigned to the particular partition in response to a request by the first user.

* * * * *